US012591824B2

(12) United States Patent
Pigeon et al.

(10) Patent No.: US 12,591,824 B2
(45) Date of Patent: Mar. 31, 2026

(54) MACHINE LEARNING-DRIVEN USER PROFILE UPDATES FOR JOB MATCHING

(71) Applicant: Indeed, Inc., Austin, TX (US)

(72) Inventors: Aaron Pigeon, Oakland, CA (US);
Madeline Nowicki, Saline, MI (US);
Dana Langseth, Seattle, WA (US);
Andrew Hudson, Austin, TX (US)

(73) Assignee: Indeed, Inc., Austin, TX (US)

( * ) Notice: Subject to any disclaimer, the term of this patent is extended or adjusted under 35 U.S.C. 154(b) by 127 days.

(21) Appl. No.: 18/238,852

(22) Filed: Aug. 28, 2023

(65) Prior Publication Data

US 2025/0077993 A1     Mar. 6, 2025

(51) Int. Cl.
*G06Q 10/0631* (2023.01)
*G06Q 10/1053* (2023.01)

(52) U.S. Cl.
CPC . *G06Q 10/063112* (2013.01); *G06Q 10/1053* (2013.01)

(58) Field of Classification Search
CPC .................. G06Q 10/1053; G06Q 10/063112
See application file for complete search history.

(56) References Cited

U.S. PATENT DOCUMENTS

| | | | | |
|---|---|---|---|---|
| 2013/0085954 A1* | 4/2013 | Hanneman | ........... | G06Q 10/105 705/321 |
| 2016/0055457 A1* | 2/2016 | Mather | .............. | G06Q 10/1053 705/321 |

| | | | | |
|---|---|---|---|---|
| 2016/0239806 A1* | 8/2016 | Benham | ............. | G06Q 10/1053 |
| 2018/0181544 A1* | 6/2018 | Zhang | .................... | G06N 3/044 |
| 2018/0307750 A1* | 10/2018 | Gupta | ................. | G06F 16/9535 |
| 2020/0272994 A1* | 8/2020 | Silveira | .................. | G06N 20/20 |
| 2020/0327505 A1* | 10/2020 | Gomes | .............. | G06Q 10/1053 |
| 2024/0176807 A1* | 5/2024 | Pulugu | .................. | G06F 16/338 |
| 2024/0242181 A1* | 7/2024 | Mishra | ................... | G06Q 50/01 |

(Continued)

OTHER PUBLICATIONS

M. Balpande, S. D. Mali, D. S. Chaudhari, N. B. Mali and K. P. Chaudhari, "Easy Job Eligibility Checking System using Machine Learning," 2023 7th International Conference on Intelligent Computing and Control Systems (ICICCS), Madurai, India, 2023 (Year: 2023).*

(Continued)

*Primary Examiner* — Johnna R Loftis
(74) *Attorney, Agent, or Firm* — Young Basile Hanlon & MacFarlane, P.C.

(57) ABSTRACT

A web platform hosting job postings uses a machine learning-driven approach to update user profile information for matching job postings with qualified job seekers. The web platform determines a job posting to serve to a job seeker device and, using a machine learning model trained to contextually evaluate job seeker user profile information against job postings, determines a high priority job qualification of the job posting that is missing from the user profile information. A representation that the job qualification is missing from the user profile information and a prompt asking whether the job seeker meets the job qualification are output within a job feed that includes information of the job posting. The web platform outputs an updated presentation of the job posting to the job seeker device to indicate, based on input obtained in response to the prompt, whether the job seeker is qualified for the job posting.

20 Claims, 11 Drawing Sheets

(56) References Cited

U.S. PATENT DOCUMENTS

| | | | | |
|---|---|---|---|---|
| 2024/0281267 A1* | 8/2024 | Richter | .............. | G06F 11/3438 |
| 2024/0303695 A1* | 9/2024 | Stewart | .............. | G06Q 30/0269 |
| 2024/0330834 A1* | 10/2024 | Tiwari | ........... | G06Q 10/063118 |
| 2025/0037083 A1* | 1/2025 | Delecraz | ............ | G06Q 10/1053 |
| 2025/0078037 A1* | 3/2025 | Lifferth | .......... | G06Q 10/063112 |

OTHER PUBLICATIONS

Chuan Qin, Hengshu Zhu, Tong Xu, Chen Zhu, Liang Jiang, Enhong Chen, and Hui Xiong. 2018. Enhancing Person-Job Fit for Talent Recruitment: An Ability-aware Neural Network Approach. In The 41st International ACM SIGIR Conference on Research & Development in Information Retrieval (SIGIR '18). (Year: 2018).*

* cited by examiner

200

202 PROCESSOR

206 STORAGE

210 USER INTERFACE

214

204 MEMORY

208 POWER SOURCE

210 NETWORK INTERFACE

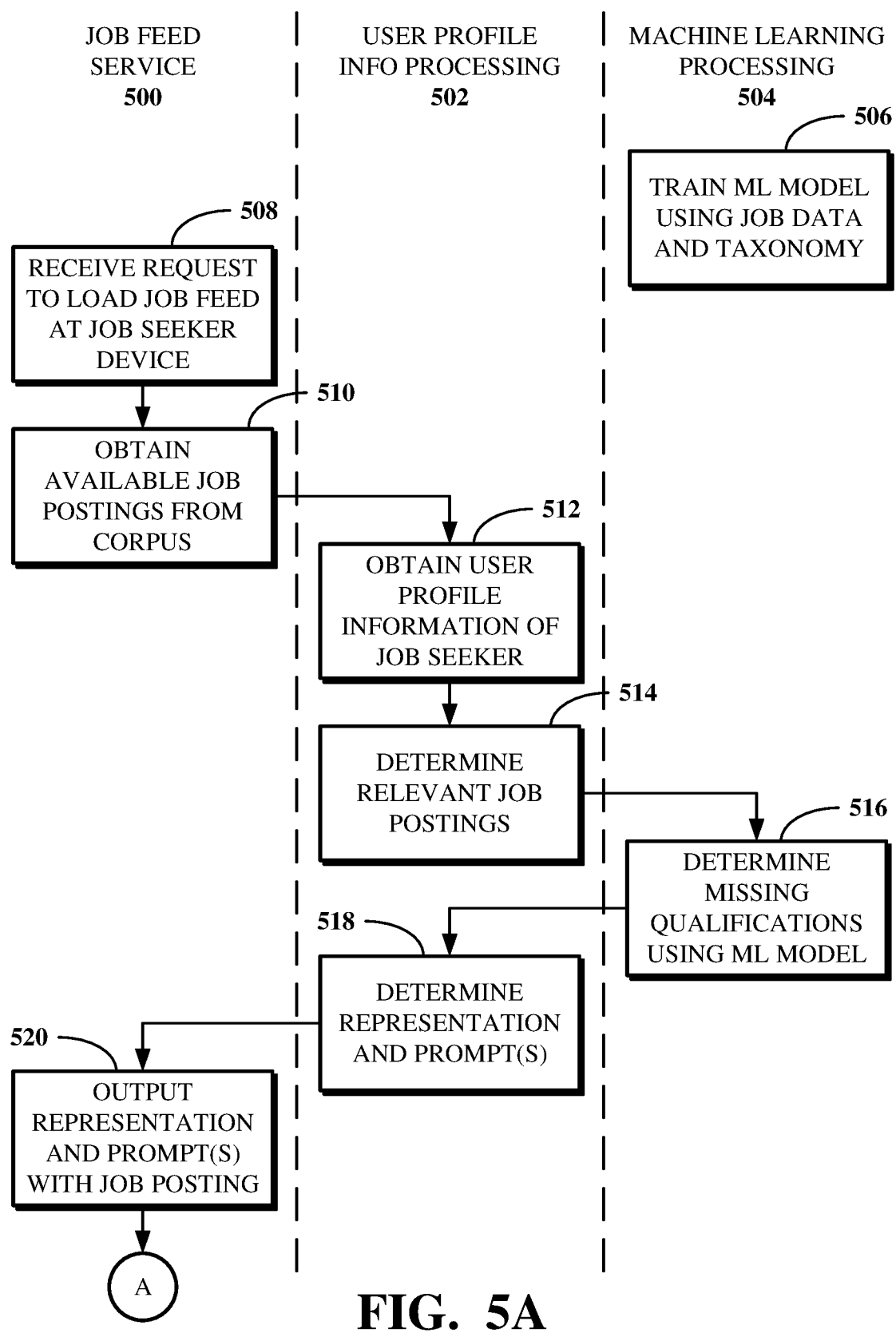

JOB FEED
SERVICE
500

USER PROFILE
INFO PROCESSING
502

MACHINE LEARNING
PROCESSING
504

506

TRAIN ML MODEL
USING JOB DATA
AND TAXONOMY

508

RECEIVE REQUEST
TO LOAD JOB FEED
AT JOB SEEKER
DEVICE

510

OBTAIN
AVAILABLE JOB
POSTINGS FROM
CORPUS

512

OBTAIN USER
PROFILE
INFORMATION OF
JOB SEEKER

514

DETERMINE
RELEVANT JOB
POSTINGS

516

DETERMINE
MISSING
QUALIFICATIONS
USING ML MODEL

518

DETERMINE
REPRESENTATION
AND PROMPT(S)

520

OUTPUT
REPRESENTATION
AND PROMPT(S)
WITH JOB POSTING

TECHNOLOGY DIRECTOR

ABC Corp.
United States – Hybrid remote
$170,000 to $210,000 a year – Full-time

| Apply now |

| Save for later |

Profile Insights
Here's how your profile aligns with the job description

*Skills*

602

| SQL ✓ |   | Debugging   ✓ |   | Analysis skills   ✓ |

| Programmable logic controllers          ✓ |   | AutoCAD   X |

| Microsoft Windows Server     ? |

604

Do you have experience in Microsoft Windows Server?   | Yes |   | No |

700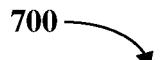

NURSE PRACTITIONER

Medical Practice Company USA
Lacey, WA 98503
$125,000 to $135,000 a year – Part-time

| Apply now | | Save for later |
|-----------|--|----------------|

---

Profile Insights
Your profile might be missing qualifications mentioned in the job description

*Licenses*                                                               702

| Certified Nurse Practitioner     ? |

Do you have a valid Certified Nurse Practitioner license?    | Yes | | No |

*Certifications*

| BC/BE  ? |  | Certified Family Nurse Practitioner  ? |

Do you have a valid BC/BE certification?    | Yes | | No |

*Skills*

| Typing    ? |

Do you have experience in Typing?    | Yes | | No |

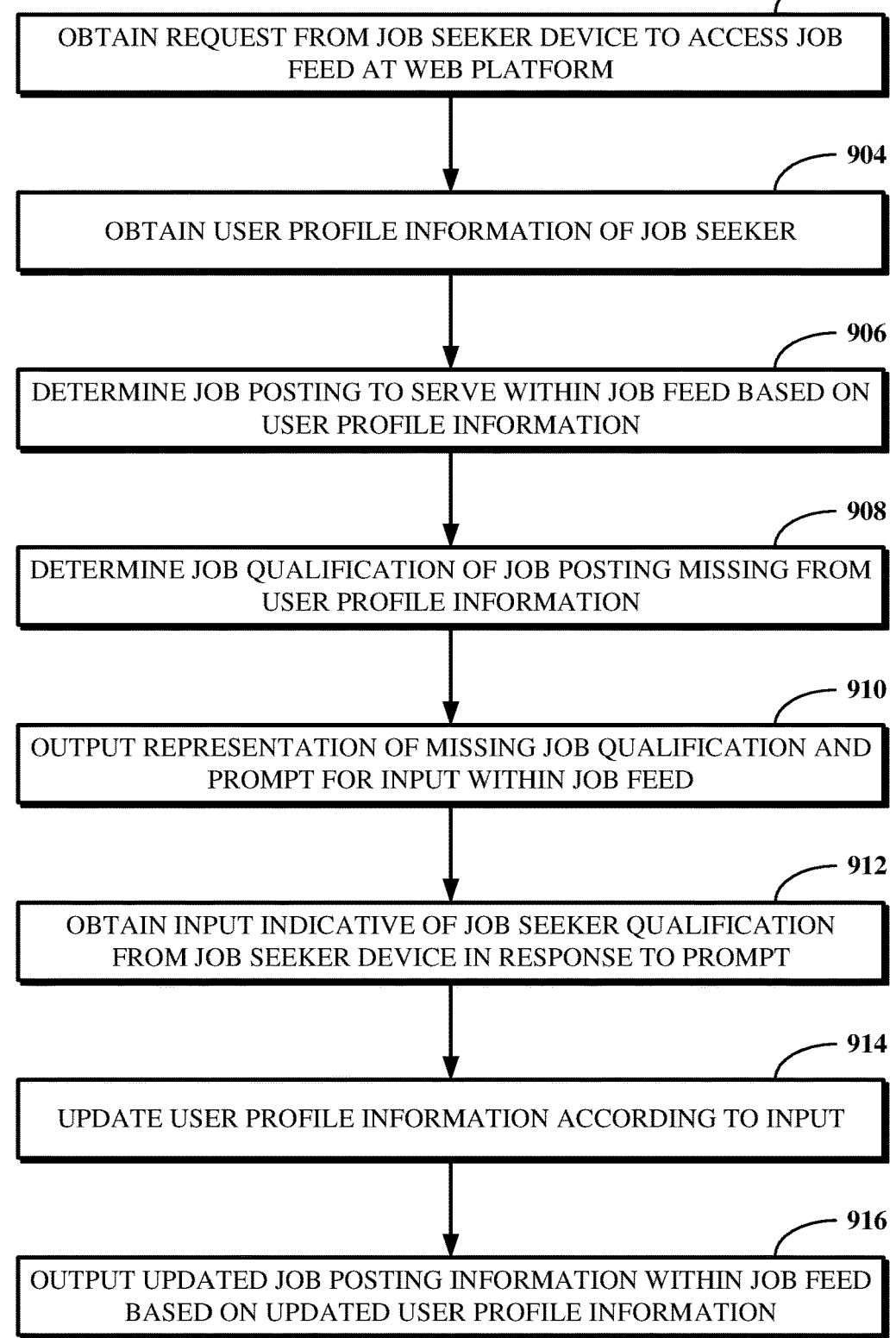

902

OBTAIN REQUEST FROM JOB SEEKER DEVICE TO ACCESS JOB FEED AT WEB PLATFORM

904

OBTAIN USER PROFILE INFORMATION OF JOB SEEKER

906

DETERMINE JOB POSTING TO SERVE WITHIN JOB FEED BASED ON USER PROFILE INFORMATION

908

DETERMINE JOB QUALIFICATION OF JOB POSTING MISSING FROM USER PROFILE INFORMATION

910

OUTPUT REPRESENTATION OF MISSING JOB QUALIFICATION AND PROMPT FOR INPUT WITHIN JOB FEED

912

OBTAIN INPUT INDICATIVE OF JOB SEEKER QUALIFICATION FROM JOB SEEKER DEVICE IN RESPONSE TO PROMPT

914

UPDATE USER PROFILE INFORMATION ACCORDING TO INPUT

916

OUTPUT UPDATED JOB POSTING INFORMATION WITHIN JOB FEED BASED ON UPDATED USER PROFILE INFORMATION

FIG. 9

MACHINE LEARNING-DRIVEN USER PROFILE UPDATES FOR JOB MATCHING

BACKGROUND

Job websites are effective and increasingly popular platforms for connecting skilled job seekers and job posters in need of support. A job poster may use a job website or a third party system interfacing with the job website to create a job posting for a specific type of work, and job seekers matching criteria listed in the job posting may interact with the job posting to pursue a new work opportunity. Similarly, a job seeker may use a job website to upload resumes and other documentation representing their skills and relevant background information to attract desirable job posters.

SUMMARY

Disclosed herein are, inter alia, implementations of systems and techniques for machine learning-driven user profile updates for job matching.

One aspect of this disclosure is a method comprising: determining, by a web platform that hosts job postings and stores records of various user profile information of job seekers, a job posting to present to a device of a job seeker; determining, by the web platform using a machine learning model trained to contextually evaluate the various user profile information against job qualifications of the job postings, that one or more job qualifications required for the job posting are missing from user profile information of the job seeker; outputting, by the web platform for display at the device of the job seeker, a representation that the one or more job qualifications are missing from the user profile information of the job seeker and one or more prompts asking whether the job seeker meets one or more high priority job qualifications of the one or more job qualifications; and outputting, by the web platform for display at the device of the job seeker, an updated presentation of the job posting indicating, based on input obtained in response to the one or more prompts, whether the job seeker is qualified for the job posting.

Another aspect of this disclosure is a non-transitory computer readable medium storing instructions operable to cause one or more processors to perform operations comprising: determining a job posting to serve within a job feed to a device of a job seeker based on user profile information indicating qualifications of the job seeker; determining, using a machine learning model trained to contextually evaluate the user profile information against job qualifications of the job posting, one or more job qualifications of the job posting that are missing from the user profile information; presenting, within a graphical user interface of the job feed to render at a display of the device of the job seeker, a prompt to ask, for each high priority job qualification of the one or more job qualification, whether the job seeker meets the job qualification; and updating the job feed according to input obtained from the device of the job seeker in response to the prompt.

Yet another aspect of this disclosure is a system comprising a memory subsystem configured to store instructions and processor circuitry configured to execute the instructions to: determine, using a machine learning model trained to contextually evaluate various user profile information for job seekers using a web platform against job qualifications of job postings hosted by the web platform, a high priority job qualification of a job posting that is missing from user profile information of a job seeker; prompt, via a graphical user interface displaying information associated with the job posting, a device of the job seeker to indicate whether the job seeker meets the high priority job qualification; and update, according to input obtained from the device of the job seeker in response to the prompting, the graphical user interface to indicate whether the job seeker is qualified for the job posting.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 5A-B are swim lane diagrams of an example sequence of operations performed for updating a user profile for job matching.

FIGS. 6, 7, and 8A-D are illustrations of example job posting information output within graphical user interfaces (GUIs) presented to a job seeker within a job feed.

FIG. 9 is a flowchart of an example of a technique for machine learning-driven user profile updates for job matching.

DETAILED DESCRIPTION

Figure 1:
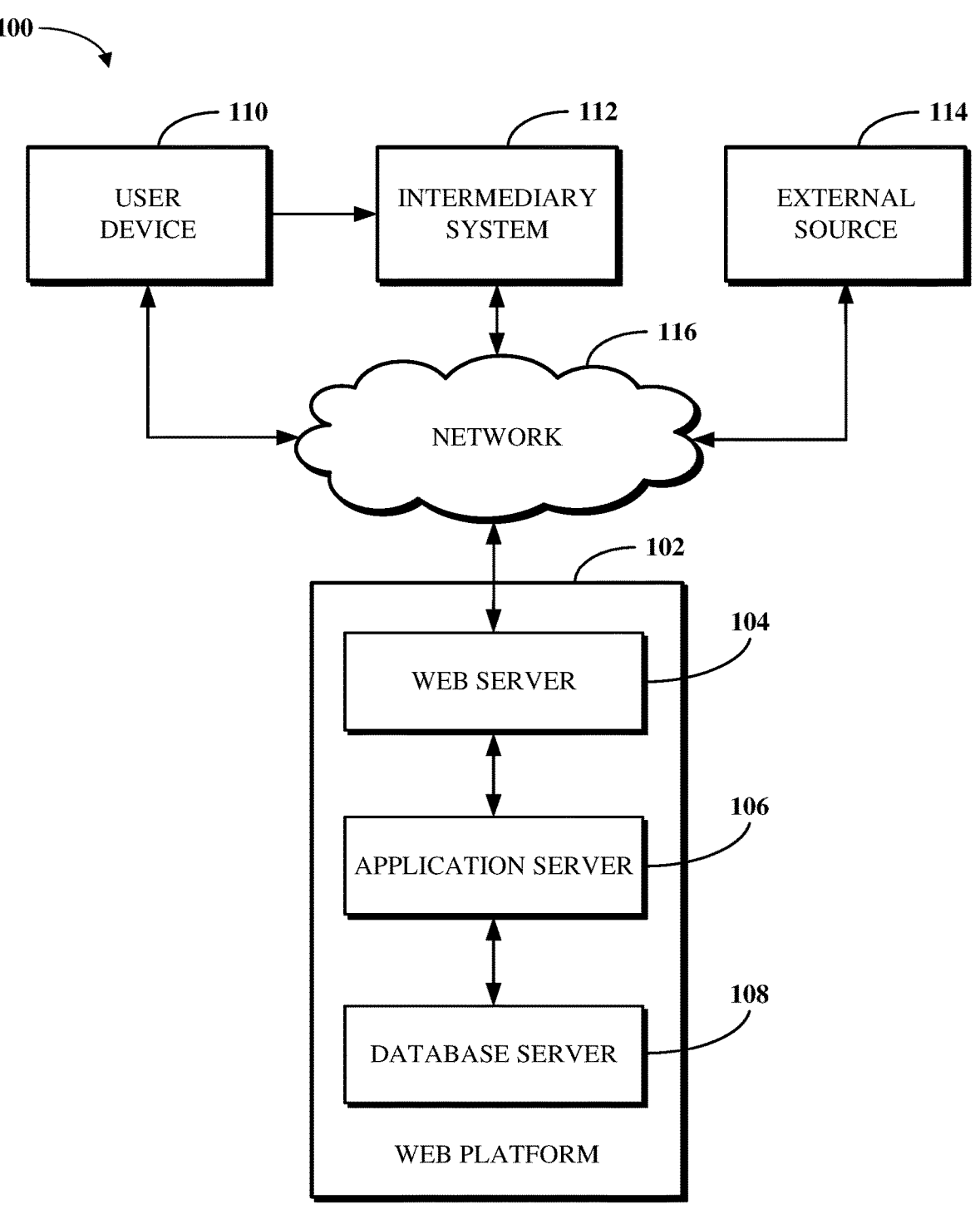
FIG. 1 is a block diagram of an example of a web platform system.

A typical hiring process based on a job posting published to a job website begins with a job seeker submitting an application containing certain biographical and qualification information relevant to the job posting. The job website could be a web service such as Indeed, ZipRecruiter, LinkedIn, and similar. Specific examples of job website products that may be used as part of a hiring process include Indeed Apply and ZipRecruiter Apply. During the hiring process, the job website facilitates the exchange of information and communications between the job seeker and the job poster, who caused the publication of the job posting, until the job seeker is either hired to the position specified in the job posting or denied for that position.

The job posting published to the job website is created using input information obtained from one or more sources, including text obtained directly at the job website from a job poster device or via a third party intermediary system which obtains that text from the job poster device and routes same to the job website. The intermediary system can include human resources information systems (HRIS) platforms and/or recruitment management systems (RMS), examples of which include Workday Human Capital Management, SAP SuccessFactors, Ceridian Dayforce, Greenhouse, Lever, SmartRecruiters, and Yello. The text may identify one or more types of information for the job posting, including, for example, a job title, an identification of the job poster entity, and a job description. The text may also identify one or more job qualifications required or otherwise desired for job seekers interested in the job, including, for example, academic and/or work experience criteria, licenses enabling work in the subject position, specialties within the subject industry, and skills related to the job. For example, a job posting for a medical position might require a particular medical expertise (e.g., surgical experience) that goes beyond a standard medical credential.

Job websites may seek to match qualified job seekers with job postings of potential interest. For example, a job website may provide a job feed personalized to each individual job seeker, in which the job feed serves select job postings for viewing within a GUI. To determine which job postings to serve to a job seeker, a job website may rely upon user profile information associated with the job seeker. User profile information generally refers to information associated with a job seeker which is usable to determine jobs or types of jobs of potential interest for the job seeker. In one particular example, the user profile information for a given job seeker may include or otherwise correspond to job qualifications, such as academic credentials, work experience, licenses held, industry specialties, and/or relevant skills. The user profile information associated with a given job seeker may be determined by the job website in one or more ways, including by the job seeker directly providing some or all of the user profile information (e.g., via a resume uploaded to the job website) and/or the job website inferring some or all of the user profile information based on information directly provided by the job seeker and/or based on activity of the job seeker within the job website (e.g., interactions by the job seeker with job postings and/or job poster user profiles).

However, a job posting that is ultimately a great fit for a job seeker may not always closely match the user profile information for the job seeker. For example, the job posting may include a job qualification that is not included in the user profile information, such as due to an unintentional omission of that job qualification by the job seeker or because the job seeker had not considered that qualification as relevant when providing their resume to the job website. This may cause the job website to not serve the job posting to the job seeker (e.g., because a recommendation engine for determining job postings to serve does not perceive enough of an overlap between qualifications of the job posting and the user profile information of the job seeker) or the job seeker to not believe that the job posting is right for them. In either such case, the mismatch between the job posting and the currently known job qualifications of the job seeker may very well result in a failure for the job poster to hire a qualified job seeker and for the job seeker to find a fitting job opportunity.

Implementations of this disclosure accordingly address problems such as those described above using machine learning-driven user profile updates for job matching. According to the implementations of this disclosure, a web platform that hosts job postings determines a relevant job posting to serve to a device of a job seeker, for example, based on the job posting corresponding to an industry or other area of focus for the job seeker. The web platform, via a machine learning model trained to contextually evaluate user profile information (e.g., resume and/or related data) of a job seeker against data associated with a job posting, determines a job qualification of the job posting that is missing from the user profile information of the job seeker. The job qualification is a criterion (e.g., a specialty or skill) indicated as required for candidates applying to the job posting and determined by the web platform to be a priority for the job posting, but which is not included within the user profile information of the job seeker. Based on the determination that the job qualification is missing from the user profile information of the job seeker, the web platform prompts the job seeker for input usable to update the user profile information to include the job qualification. In cases where the job seeker provides such input, the web platform reevaluates the updated user profile information against the job posting to determine, and present output indicating, that the job seeker may be a good match for the job posting. Thus, using the implementations of this disclosure, a job website such as Indeed can measurably improve the fulfillment of job postings by job seekers who provide user profile information with missing qualification content.

The web platform may leverage a multi-tiered, contextual approach to represent the quality of a match between user profile information of a job seeker and a job posting based on any job qualifications determined by the web platform to be missing from the user profile information. The multi-tiered, contextual approach may be specifically designed to easily signal a magnitude of a match between the job seeker and the job posting without complex consideration. In one non-limiting example, the multi-tiered contextual approach may leverage a color scheme similar to a typical traffic light in which: a green marking associated with a job posting indicates that the user profile information of the job seeker currently matches job qualifications of the job posting; a yellow marking associated with the job posting indicates that the user profile information is missing one or more qualifications that, if added to the user profile information, would result in a match; and a red marking associated with the job posting indicates that the user profile information is too distinct from the job posting to consider the job seeker a good candidate for the job posting. In some cases, where job postings are selectively served to a job seeker based on a threshold relevance determination, red markings and the like may not be used, and the web platform may instead present a green or yellow marking on each served job posting.

The prompt presented to a job seeker for input usable to update their user profile information uses text to ask the job seeker whether they meet the job qualification. For example, where the job qualification corresponds to a surgical specialty for a medical assistant job posting, the prompt may ask the job seeker whether they have surgical experience. Moreover, the prompt may be presented in a manner so as to minimize the actions required by the job seeker. For example, the web platform may determine an on-screen location of the subject job qualification within the job posting and present the prompt at an adjacent screen location. The web platform may also present one or more interactive user interface elements (e.g., yes and no buttons) as part of the prompt to normalize job seeker responses as well as to simplify input collection. For example, where the job seeker clicks on or otherwise interacts with a "yes" button within a prompt, the web platform may use that input to update the user profile information of the job seeker to include the subject job qualification within a relevant field of the user profile information. In the example described above, the web platform may add "surgery" within a list of specialties of the job seeker. Updating the user profile information of the job seeker in this way may cause both a user profile page for the job seeker to reflect the updated information as well as a job feed within which the job posting is served to indicate that the subject job qualification is met by the job seeker.

In some cases, the multi-tiered, contextual approach disclosed herein may determine that a job qualification typically required for jobs like the job of a subject job posting and/or which is predictive of a job seeker being hired is missing from the job posting. For example, the web platform may (e.g., via machine learning functionality or otherwise) perform a processing against job qualifications of the job posting when the job posting is created or at a time thereafter to determine, based on one or more criterion associated with the job posting, that a job qualification is missing from the job posting. The one or more criterion may, for example, correspond to one or both of a job title of the job posting or an industry associated with the job posting. To determine that the job qualification is missing, the web platform (e.g., via the machine learning functionality or otherwise) may compare the job qualifications of the job posting against job qualifications of like, historical job postings (e.g., those identical or ontologically similar in job title to the job title of the subject job posting) to determine that a job qualification present in some or all of those like, historical job postings is not included in the subject job posting. In some such cases, the web platform (e.g., via the machine learning functionality or otherwise) may further evaluate information associate with those like, historical job postings to determine that the job qualification missing from the job posting is one that commonly, often, or otherwise frequently results in job fulfillment when met by a job seeker.

While the implementations of this disclosure largely focus on matching a job seeker to a job posting within a web platform environment, the systems and techniques disclosed herein may also or instead be used in other environments. In one non-limiting example, techniques such as those disclosed herein may be used in the context of general searches, such as which may be performed using an Internet search engine or another search engine deployed for a specific library, collection, or set of physical and/or virtual elements. In such a case, the "job seeker" is the person or entity requesting the search, the "user profile information" is the query for the search, and the "job posting" is a prospective result which may be presented based on the search request and query. For example, a search engine may perform a search based on the search request and query to determine a preliminary result that is relevant to the query, but which includes an attribute (e.g., a keyword) missing from the query. The search engine may responsively present a prompt to the user to obtain input indicating whether the attribute is to be included in the query. Based on the input indicating to include the attribute in the query, the search engine presents the preliminary result to the user. In some cases, the preliminary result may have already been presented to the user within a list of search results, and, responsive to the input indicating that the attribute is to be included in the query, the search engine may automatically perform a secondary search using the updated query to present an updated list of search results, including the preliminary result, to the user.

To describe some implementations in greater detail, reference is first made to examples of hardware and software structures used to implement a system for machine learning-driven user profile updates for job matching. FIG. 1 is a block diagram of an example of a web platform system 100, which includes a web platform 102. The web platform 102 implements a job website for enabling job seeking users (i.e., job seekers) to upload credential details and search for job opportunities via job postings and for enabling job posting users (i.e., job posters) to create and manage job postings and view engagement information associated with job seekers who have viewed and engaged with such job postings. The web platform 102 implements the job website using one or more servers, including a web server 104, an application server 106, and a database server 108. For example, the web server 104, the application server 106, and the database server 108 may be implemented by one or more servers or server racks located within one or more datacenters. A user of the web platform 102 may access the web platform 102 via a user device 110, which may, for example, be a mobile phone, a tablet computer, a laptop computer, a notebook computer, a desktop computer, or another suitable computing device or combination of computing devices.

The web server 104 processes requests (e.g., hypertext transport protocol (HTTP)-based requests) received from user devices, such as the user device 110, destined for a software service associated with the web platform 102. In particular, the web server 104 operates as a conduit to content of the web platform 102 to be served to the user device 110 in response to requests received therefrom. The content derives from the application server 106 and is routed via the web server 104 to the user device 110 for rendering at the user device 110, for example, within a web browser or other software application running at the user device.

The application server 106 runs one or more software services associated with the web platform 102 which may be delivered to the user device 110 based on requests processed via the web server 104. For example, the application server 106 may implement a web application for the job website of the web platform 102. The application server 106 can include one or more application nodes, which can each be a process executed on the application server 106 to deliver software services to the user device 110, as part of the web platform 102. An application node can be implemented using processing threads, virtual machine instantiations, or other computing features of the application server 106. In some cases where the application server 106 can includes two or more application nodes forming a node cluster, those application nodes, while implemented on a single application server 106, can run on a single hardware server or different hardware servers.

The database server 108 manages (e.g., stores or otherwise provides) data usable to deliver software services implemented by the application server 106 to the user device 110. The database server 108 may implement one or more databases, tables, or other information sources suitable for use with such a software service. The database server 108 may include a data storage unit accessible by software executed on the application server 106. A database implemented by the database server 108 may, for example, be a relational database management system, an object database, an extensible markup language (XML) database, one or more flat files, other suitable non-transient storage mechanisms, or a combination thereof. In some cases, one or more databases, tables, other suitable information sources, or portions or combinations thereof may be stored, managed, or otherwise provided by a component other than the database server 110, for example, the user device 110 or the application server 106.

Where the user device 110 is used by a job poster, some or all of the information usable to create a job posting at the web platform 102 may derive from the user device 110. However, in some such cases, some or all such information may derive other than from the user device 110. For example, such information may derive from one or both of an intermediary system 112 or an external source 114.

The intermediary system 112 is software usable to route information usable to create a job posting to one or more web platforms including the web platform 102. For example, the intermediary system 112 may be an applicant tracking system (ATS). A user of an ATS may, for example, cause information associated with a job posting to be created from the ATS to each of the multiple web platforms, such as to attempt to reach a wider pool of potential job seeker candidates using different ones of those web platforms. The intermediary system 112 may thus obtain the information associated with the job posting directly from the user device 110.

The external source 114 is an electronic communication component configured to store information in one or more contexts. For example, the external source 114 may be an online social media platform, a cloud storage system, a company website associated with the user of the user device 110, or another website or software service that at one or more times obtained and stored information which may be relevant to otherwise associated with a job posting to be created. The external source 114 may, for example, transmit such information to the web platform 102 based on a request from the web platform 102 or the user device 110 made over an application programming interface (API) call.

Where the user device 110 is used by a job seeker, the user device 110 may transmit input to the web platform 102 to cause the web platform 102 to generate or otherwise host user profile information associated with the job seeker. For example, the input transmitted by the user device 110 may correspond to a resume document or other document which includes details relevant to the academic and/or work history of the job seeker. In another example, the input transmitted by the user device 110 may correspond to information related to a resume which is provided within one or more data collection fields presented by the web platform 102 (e.g., within one or more GUIs rendered at the user device 110).

The user device 110, the intermediary system 112, and the external source 114 each communicates with the servers 104 through 108 of the web platform 102 via a network 116. The network 116 can be or include the Internet, a local area network (LAN), a wide area network (WAN), a virtual private network (VPN), or another public or private means of electronic computer communication capable of transferring data between devices. The network 116, or another element, or combination of elements, of the system 100 can include network hardware such as routers, switches, other network devices, or combinations thereof. For example, a datacenter at which one or more of the servers 104 through 108 are located can include a load balancer for routing traffic from the network 116 to ones of those servers at the datacenter. The load balancer can route, or direct, computing communications traffic, such as signals or messages, to respective elements of the datacenter. For example, the load balancer can operate as a proxy, or reverse proxy, for a service associated with the web platform 102 or another service provided to the user device 110, by the web server 104, the application server 106, and/or another server. Routing functions of the load balancer can be configured directly or via a domain name service (DNS). In some implementations, the load balancer can operate as a firewall, allowing or preventing communications based on configuration settings.

As will be described below in further detail, the web platform system 100 in relevant part performs machine learning-driven user profile updates for job matching. In particular, the web platform system 100 is configured to train one or more machine learning models to contextually evaluate user profile information of job seekers against job postings hosted by the web platform system 100 to determine job qualifications of the job postings that are missing from the user profile information but which, if added to the user profile information, would render the job seekers as qualified candidates for the job postings. Such a machine learning model may be trained based on a corpus of job postings hosted by the web platform system 100 and/or a corpus of user profile information for job seekers using the web platform system 100. The output of such a trained machine learning model indicates one or more job qualifications to prompt a subject job seeker about, in particular, to obtain input indicating whether the job seeker meets those job qualifications despite their user profile information missing same. The web platform system 100, based on such output, transmits various GUI instructions for rendering at a job seeker device (e.g., the user device 110) to prompt the job seeker for such input.

Figure 2:
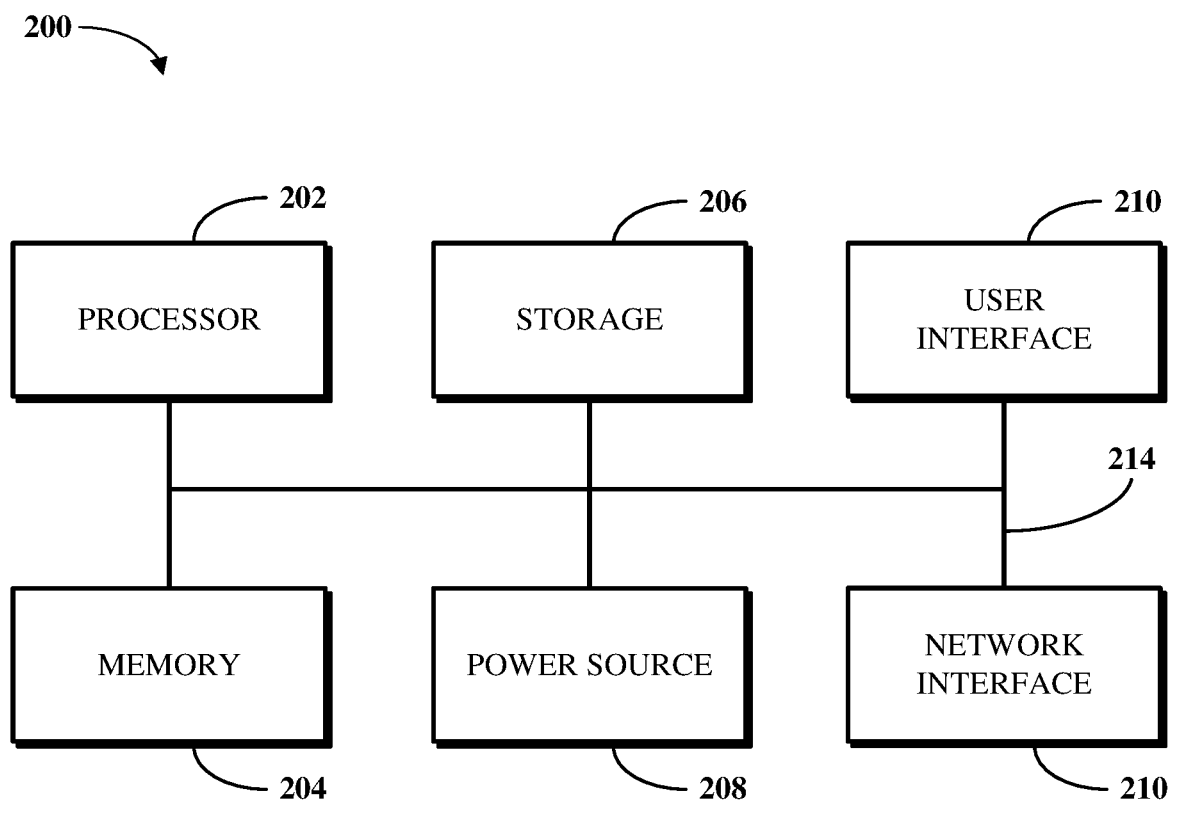
FIG. 2 is a block diagram of an example of a computing device used with a web platform system.

FIG. 2 is a block diagram of an example of a computing device 200 used with a web platform system, for example, the web platform system 100 shown in FIG. 1. The computing device 200 may, for example, be or be used to implement one or more of the web server 104, the application server 106, the database server 108, or the user device 110, all as shown in FIG. 1. The computing device 200 includes a processor 202, a memory 204, a storage 206, a power source 208, a user interface 210, and a network interface 212, all connected via a bus 214.

The processor 202 is a central processing unit, such as a microprocessor, having one or more processing cores. In some cases, the processor 202 can include another type of device, or multiple devices of one or more types, configured for manipulating or processing information. For example, operations performed by the processor 202 can be distributed across multiple devices that can be coupled directly (e.g., via a hardwired connection) or across a local area or other suitable type of network (e.g., via a networked connection). The processor 202 can include a cache for local storage of operating data or instructions.

The memory 204 includes one or more volatile memory components, such as random access memory (RAM), for example, static RAM (SRAM) and/or dynamic RAM (DRAM). In some cases, the memory 204 can represent a portion of memory distributed across multiple devices. In such a case, the memory 204 can include network-based memory or memory in multiple computing devices (e.g., in client-server or other arrangements) performing the operations of those multiple computing devices. The memory 204 includes operating data or instructions for immediate access by the processor 202. In one example, the memory 204 can include executable instructions corresponding to one or more application programs, which instructions can be loaded or copied, in whole or in part, from the storage 206 to the memory 204 to be executed by the processor 202, such as for performing some or all of the techniques of this disclosure. In another example, the memory 204 can include application data, such as user data, database data, functional program data, or the like. In yet another example, the memory 204 can include an operating system, for example, Microsoft Windows®, Mac OS X®, or Linux®, an operating system for a mobile device (e.g., a smartphone or tablet device), or an operating system for a non-mobile device (e.g., a mainframe computer).

The storage 206 includes one or more non-volatile memory components, such as a disk drive, a solid state drive, flash memory, or phase-change memory. The storage 206 stores operating data or instructions to be loaded or copied, in whole or in part, into the memory 204 to be executed by the processor 202. In some cases, the storage 206 can represent a portion of storage distributed across multiple devices. In such a case, the storage 206 can include network-based storage or storage in multiple computing devices (e.g., in client-server or other arrangements) performing the operations of those multiple computing devices.

The power source 208 delivers power to other components of the computing device 200. The power source 208 may, for example, be an interface (e.g., a power cable port) to an external power distribution system or a battery. In some cases, the power source 208 may include multiple power sources. For example, one of the multiple power sources can be a backup battery.

The user interface 210 includes one or more input interfaces and/or one or more output interfaces. An input interface may, for example, be a positional input device (e.g., a mouse, touchpad, or touchscreen), a keyboard, an audio input device (e.g., a microphone), or another suitable human or machine interface device. An output interface may, for example, be a display (e.g., a liquid crystal display, a cathode-ray tube, a light emitting diode display, or another suitable display) an audio output device (e.g., a speaker), or another suitable human or machine interface device.

The network interface 212 includes a wired network interface or a wireless network interface for interfacing with (i.e., connecting to) a network (e.g., the network 116 shown in FIG. 1). The network interface 212 enables the computing device 200 to communicate with other devices using one or more network protocols, for example, ethernet, transmission control protocol (TCP), internet protocol (IP), power line communication, an IEEE 802.X protocol (e.g., Wi-Fi, Bluetooth, or ZigBee), general packet radio service (GPRS), global system for mobile communications (GSM), code-division multiple access (CDMA), Z-Wave, another protocol, or a combination thereof.

Figure 3:
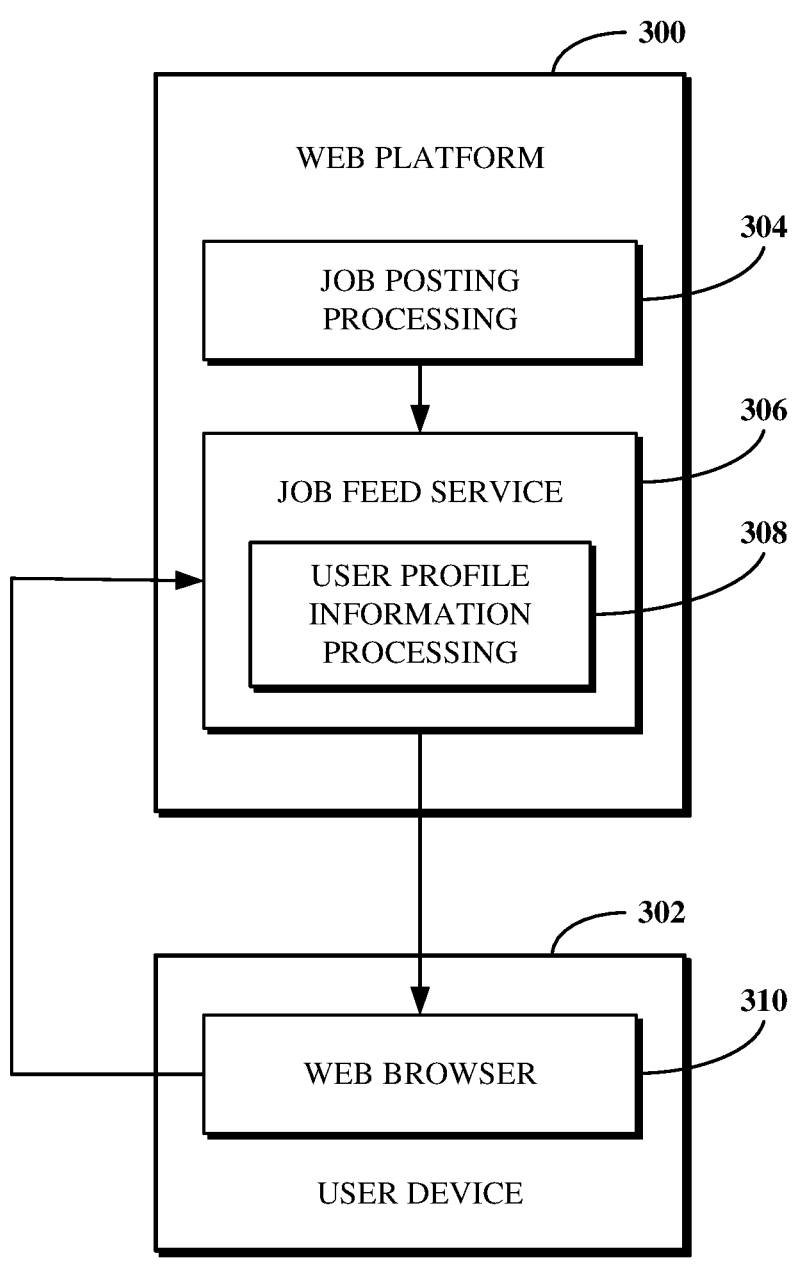
FIG. 3 is a block diagram of an example of a web platform that hosts job postings.

FIG. 3 is a block diagram of an example of a web platform 300 that hosts job postings. The web platform 300, which may, for example, be the web platform 102 shown in FIG. 1, is a software platform associated with a job posting website. A user of a user device 302, which may, for example, be the user device 110 shown in FIG. 1, may access the web platform 300 to, amongst other things, view job postings and update their user profile information in connection with the viewing of such job postings. Such functionality of the web platform 300 is provided by way of various software which may, for example, be implemented using the application server 106 shown in FIG. 1. As shown, the software includes or otherwise relate to job posting processing software 304, job feed service software 306, and user profile information processing software 308. The software 304 through 308 includes tools, such as programs, subprograms, functions, routines, subroutines, operations, and/or the like for machine learning-driven profile updates for job matching, in connection with job postings hosted at the web platform 300.

The job posting processing software 304 generates and/or publishes job postings for hosting at the web platform 300 based on input obtained from one or more sources. The input specifies, amongst other things, qualifications for the job posting, including, without limitation, academic credentials, work experience, industry specialties, and/or relevant skills required for job seeker candidates who apply for the job associated with the job posting. The one or more sources from which the input may be obtained may include the user device 302, an intermediary system (e.g., the intermediary system 112 shown in FIG. 1), or an external source (e.g., the external source 114 shown in FIG. 1).

The job feed service software 306 operates a job feed usable to display job posting information to a user of the user device 302 within one or more GUIs. The job feed may be or otherwise represent a stream of job posting information, which may be dynamically updated according to user activity within the job feed, for displaying the job posting information to the user of the user device 302. In one example, the job posting information for a given job posting may be displayed within a contained region of the job feed (e.g., demarcated using a border), in which the job feed may include multiple such contained regions each corresponding to a different job posting and in which the contained regions may be of the same or different dimensions. The job feed serve software 306 determines to present a job feed to the user device 302 in one or more ways. In some cases, the job feed service software 306 may determine to present a job feed to the user device 302 in response to a search query obtained from the user device 302. For example, a user of the user device 302 may interface with search functionality of the web platform 300 by entering a search query within a designated input capture space. In another example, a user of the user device 302 may navigate to the job feed independent of a search. For example, a dedicated web page for a job feed may be accessible from a home or other main page of the web platform 300.

The job feed service software 306 determines the job postings to serve to the user device 302 within the job feed using the user profile information processing software 308. The user profile information processing software 308, which is shown as being included in the job feed service software 306 but which in some implementations may be external to the job feed service software 306, operates as a filter against a corpus of job postings hosted by the web platform 300 to determine job postings that are relevant to the user of the user device 302 from amongst that corpus. Generally, the corpus of job postings is a set, collection, compilation, aggregation, or other grouping of related or unrelated job postings hosted on the web platform 300. While the corpus of job postings may in some cases include historical job postings (e.g., job postings which have expired and/or have been fulfilled by a qualified job seeker candidate), in the context of the user profile information processing software 308, only active and unfulfilled job postings of the corpus will be processed for possible service within the job feed.

The user profile information processing software 308 processes the user profile information of the user of the user device 302 against the corpus of job postings to determine the job postings for the job feed service software 306 to serve within the job feed. For example, the job feed may be personalized according to user profile information of the user of the user device 302. The user profile information processing software 308, upon the job feed service software 306 receiving a request from the user device 302 to access the job feed, may dynamically process stored data associated with the user profile information of the user of the user device 302 to determine (e.g., identify) job postings awaiting fulfillment and which are relevant to the user profile information. For example, a job posting may be relevant to the user profile information of the user of the user device 302 where the job posting corresponds to an industry within which the user of the user device 302 has work experience according to the user profile information or another industry that is ontologically related to that industry. Other examples for determining job postings to serve are also possible.

In particular, the user profile information processing software 308 may determine the job postings of the corpus to serve within the job feed for the user of the user device 302 using a machine learning model trained to contextually evaluate the various user profile information against job qualifications of the job postings. A machine learning model as used herein may be one or more of a neural network (e.g., a convolutional neural network, recurrent neural network, or other neural network), decision tree, vector machine, Bayesian network, genetic algorithm, deep learning system separate from a neural network, or other machine learning model. The machine learning model may be supervised or unsupervised. The machine learning model applies intelligence to identify complex patterns in the input and to leverage those patterns to produce output and refine systemic understanding of the relevance of subject job postings to subject user profile information. Implementations and examples of training and inferencing using such a machine learning model are described below with respect to FIG. 4.

Determining a job posting to serve within the job feed for the user of the user device 302 using the trained machine learning model may include a two-step process. In a first step, the machine learning model processes the user profile information for the user of the user device 302 against information associated with the job posting to determine whether the job posting is relevant to the user of the user device 302. Generally, a job posting is relevant to the user of the user device 302 where an industry for the job corresponding to the job posting matches or is ontologically related to an industry within which the user of the user device 302 has experience or where a job title for that job matches or is ontologically related to one or more job titles currently or previously held by the user of the user device 302. For example, a first industry or title is ontologically related to a second industry or title where there are fewer than a threshold number of degrees of separation between them within a taxonomy.

In a second step, the machine learning model processes the user profile information of the user of the user device 302 against the relevant job postings to determine job qualifications of the job postings that are missing from the user profile information. To determine whether a job qualification of a job posting is missing from the user profile information of the user of the user device 302, the user profile information processing software 308 normalizes the job qualification according to an ontology of or otherwise available to the web platform, normalizes qualifications of the user profile information according to the ontology, and determines a degree of separation between the normalized job qualification and user profile information qualifications within the ontology. For example, if the normalized job qualification is within a threshold number of leaps from any normalized qualification of the user profile information according to the ontology, the job qualification may be determined to not be missing from the user profile information. Similarly, if the normalized job qualification is more than the threshold number of leaps away from same according to the ontology, the job qualification may be determined to be missing from the user profile information. The threshold number of leaps to use for this processing may be based on a default value for job qualifications, based on the category of the job qualification (e.g., license, certification, specialty, or skill), or the like.

In some implementations, the two steps described above may be combined into a single step. For example, the user profile information processing software 308 may use the trained machine learning model to determine, from amongst a job posting corpus of the web platform 300, one or more job postings that are relevant to the user of the user device 302 and which include less than a threshold number of job qualifications that are missing from the user profile information of the user of the user device 302.

For each job posting that has one or more job qualifications missing from the user profile information of the user of the user device 302, the user profile information processing software 308 causes the job feed service software 306 to include, as output presented within the job feed, a representation that the one or more job qualifications are missing from the user profile information of the user of the user device 302 and, for each of the one or more missing job qualifications, a prompt asking whether the user of the user device 302 meets the job qualification. The web platform 300, via the job feed service software 306, outputs, for display at the user device 302, a representation that the one or more job qualifications are missing from the user profile information of the user of the user device 302 and a prompt asking whether the user of the user device 302 meets those one or more job qualification. The user of the user device 302 views the representation and the prompt within a GUI of the job feed and interacts with the prompt within the GUI to indicate whether the job seeker meets the job qualification. For example, where the job posting is for a Technical Director job and a missing job qualification corresponds to a structured query language (SQL) skill, the prompt may ask the user of the user device 302 whether they have experience with SQL.

The job feed service software 306 obtains input from the user device 302 in response to the prompt output for a given missing job qualification and updates the presentation of the job posting within the job feed GUI according to that input. In particular, because the input indicates whether the job seeker meets the missing job qualification, the job feed service software 306 can use the input to update the job posting information within the job feed GUI so as to output an indication of whether the user device 302 is qualified for the job posting. In some cases, the job feed service software 306 can use the input to instead update the job posting information with the job feed GUI so as to output an indication of whether the job posting is a good fit for the user of the user device 302. In either case, based on the updated output presented to the user device 302, the user of the user device 302 may make a more informed decision regarding whether to apply for the job corresponding to the job posting.

The software 304 through 308 is described above as being web-based, such as by the use of the web browser 310 to access and communicate with the web platform 300. However, in some implementations, the software 304 through 308 may instead or additionally be application-based. For example, in an application-based approach of the software 304 through 308, the user device 302 may include a software application (e.g., a client application configured to interact with server-side software of the web platform 300) for connecting the user device 302 to the web platform 300. For example, where the user device 302 is a mobile device such as a smartphone or tablet computer, the software application may be downloaded from an operating system-specific application marketplace and run at the mobile device independent of web browser software at the mobile device to access the web platform 300.

Figure 4:
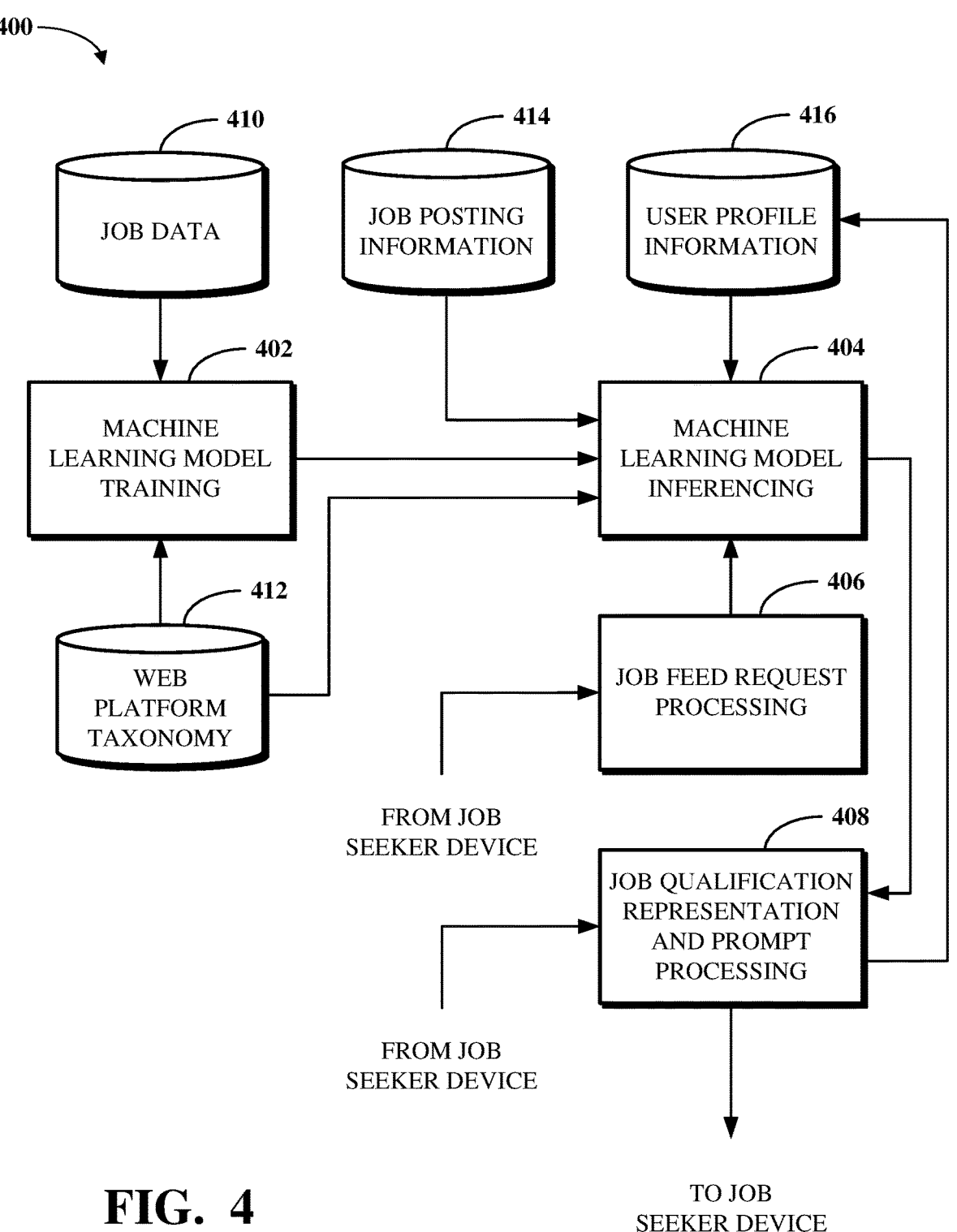
FIG. 4 is a block diagram of an example of a job matching system for using machine learning to determine user profile update prompts for matching job postings to job seekers.

FIG. 4 is a block diagram of an example of a job matching system 400 for using machine learning to determine user profile update prompts for matching job postings to job seekers. As shown, the system 400 includes software components used for machine learning-driven profile updates for job matching. However, the system 400 should be understood to also include hardware components which implement the software components shown. Those hardware components may span one or more computing devices (e.g., hardware servers) and thus utilize a memory subsystem storing instructions executable at those one or more computing devices as well as processing circuitry to execute the instructions at those one or more computing devices. For example, the memory subsystem and the processing circuitry may span one or more memories or processors, respectively, across one or more servers, datacenters, and/or the like.

The software components shown in the system 400 include machine learning model training software 402, machine learning model inferencing software 404, job feed request processing software 406, and job qualification representation and prompt processing software 408. The software 402 through 408 each correspond to one or both of processes for training a machine learning model to contextually evaluate the various user profile information against job qualifications of the job postings or for using such a trained machine learning model to determine one or more job qualifications of a job posting that are missing from user profile information of a job seeker. While the software 402 through 408 are shown as separate software components, in some implementations, some or all of the software 402 through 408 may be combined into a single software component.

The software components 402 through 408 are included in or otherwise used by a web platform, such as the web platform 300 shown in FIG. 3, to process requests for job feed information from a job seeker device, such as the user device 310 shown in FIG. 3, and to serve job posting information to the job seeker device based on that request. For example, the software components shown in the system 400 may be components of or otherwise used by one or more of the job posting processing software 304 shown in FIG. 3, the job feed service software 306 shown in FIG. 3, the user profile information processing software 308 shown in FIG. 3, or other software of or usable by the web platform 300.

The machine learning model training software 402 trains a machine learning model for use in determining job qualifications of job postings that are missing from user profile information of individual job seekers. In particular, the machine learning model training software 402 uses data stored within a job data store 410 and a web platform taxonomy 412 to train the machine learning model to evaluate various user profile information against job qualifications of job postings. The job data store 410 stores data related to jobs identifiable to the web platform, for example, jobs which were fulfilled via the web platform such as using job postings hosted by the web platform. In particular, the data stored in the job data store 410 for a given job relates to a job posting which included some number of job qualifications and an anonymized job seeker whose user profile information met or did not meet ones of those job qualifications. For example, the data stored in the job data store 410 for a job with the job title "nurse practitioner" may relate to a job posting which used that job title, job qualifications listed within that job posting, and user profile information for a job seeker who applied to that job posting, in which the user profile information identifies job titles within the work experience of the job seeker and job qualifications of the job seeker. In some cases, the job data store 410 may store data originating from one or more systems external to the web platform, such as ATSs. While the job data store 410 is shown and described as a single data store, in some implementations, it may represent multiple data stores each storing different sets of the job data.

The web platform taxonomy 412 classifies information used within the web platform into groups, types, sub-groups, sub-types, and the like. In particular, the elements included in the web platform taxonomy 412 relate to information such as job titles, job qualifications, and the like. In some cases, the elements included in the web platform taxonomy 412 may be normalized, for example, using semantically relevant terminology for different sub-groups or sub-types. For example, the web platform taxonomy 412 may normalize the job titles "neurologist" and "cardiologist" into the normalized element "doctor" which different sub-groups or sub-types corresponding to different specialties. The web platform taxonomy 412 defines ontological relationships between elements of the web platform taxonomy 412 to explain how the groups, types, sub-groups, and sub-types relate. In one example, the web platform taxonomy 412 may be represented using a knowledge graph. For example, the knowledge graph may be a collection of triplets in which each triplet corresponds to a head, or first, node; a tail, or second, node; and a relationship between the first and second nodes. The nodes in the knowledge graph may correspond, for example, to one of a normalized job title or a normalized job qualification. The relationships between a set of nodes may thus correlate certain job qualifications with certain job titles.

The machine learning model training software 402 trains the machine learning model to recognize matches between job qualifications of job seekers who applied for job postings and the job qualifications of those job postings in view of the normalized elements within the web platform taxonomy 412. The output of the machine learning model training software 402 is thus a trained machine learning model capable of receiving, as input, information associated with job qualifications of a job posting and of a job seeker and producing, as output, an indication of one or more job qualifications of the job posting that are not matched by, and thus are missing from, the job qualifications of the job seeker.

The machine learning model inferencing software 404 uses the machine learning model trained by the machine learning model training software 402 to inference against information of a job posting and user profile information of a job seeker to determine job qualifications of the job posting that are missing from the user profile information of the job seeker, in which a number of the missing job qualifications is an integer between zero and a total number of job qualifications of the job posting.

The machine learning model inferencing software 404 initiates performance of an inference process using the trained machine learning model against information of the job posting and the user profile information of the job seeker based on (e.g., in response to) a request for job posting service to a device of the job seeker. For example, the request may be generated and/or obtained based on the job seeker, as the user of the device, requesting to access a job feed at a webpage of the web platform. The request for the job posting service is obtained at the system 400 by the job feed request processing software 406, which interfaces between the device of the job seeker and the machine learning model inferencing software 404.

The job feed request processing software 406 initiates a process to determine job postings that are relevant to the job seeker and matches between job qualifications of those job postings with job qualifications of the job seeker. In particular, based on the request for the job posting service, the job feed request processing software 406 causes the machine learning model inferencing software 404 to obtain information associated with a subject job posting from a job posting information data store 414 and user profile information of the job seeker from a user profile information data store 416.

The job posting information data store 414 stores records associated with job posting information, such as information of a current job posting to serve to the device of the job seeker based on the request for the job posting service. For example, a record associated with a job posting as stored within the job posting information data store 414 may include information obtained from a job posting user of the web platform, information obtained from an ATS, and/or other information associated with the job posting. The user profile information data store 416 stores records of user profile information, such as resume and like information for the job seeker using the device from which the request for the job posting service is obtained. For example, a record associated with the user profile information of a job seeker may include user information obtained directly from the job seeker (e.g., via a resume document uploaded to the web platform), user information inferred based on one or more interactions by the job seeker within the web platform (e.g., based on job seeker activity with respect to job postings), and/or the like. Because names, labels, and the like may semantically differ while still referring to a same job qualification, the machine learning model inferencing software 404 uses the web platform taxonomy 412 to determine whether a job qualification of the job posting is actually missing from the user profile information of the job seeker (i.e., as opposed to being differently labeled or named within the user profile information).

For each job posting to include in the job feed to serve to the device of the job seeker, the machine learning model inferencing software 404 evaluates the job qualifications of the job posting, as indicated within the record from the job posting information data store 414, against the job qualifications of the job seeker, as indicated within the user profile information data store 416. For example, the machine learning model inferencing software 404 may extract qualification information for the job seeker from a record of the user profile information of the job seeker and inference, using the machine learning model, the qualification information and other qualification information ontologically related to the qualification information against job qualifications of the job posting and other job qualifications ontologically related to the job qualifications to determine that the qualification information and the other qualification information are missing the one or more subject job qualifications.

The machine learning model inferencing software 404 is thus configured to identify each job qualification of the job posting that is missing from the user profile information of the job seeker. In some cases, the machine learning model inferencing software 404 is configured to identify high priority job qualifications of the job posting that are missing from the user profile information of the job seeker. For example, a high priority job qualification may refer to a job qualification that is most important for placement or other fulfillment of the subject job. The machine learning model used by the machine learning model inferencing software 404 may be trained to evaluate job qualifications of the job posting to determine ones of the job qualifications that are high priority. For example, high priority designations may be associated with certain types of job qualifications, such as licenses required to practice professionally and/or specialties within a given industry area.

The output of the machine learning model inferencing software 404, which identifies a job qualifications required for the job posting that are missing from the user profile information of the job seeker, is then obtained by the job qualification representation and prompt processing software 408. The job qualification representation and prompt processing software 408 processes that output to generate and prepare, for output for display at the device of the job seeker within the job feed to serve to that job seeker device, a representation that the one or more subject job qualifications are missing from the user profile information of the job seeker and one or more prompts asking whether the job seeker meets one or more job qualifications (e.g., one or more high priority job qualifications) of the missing job qualifications indicated in the output of the machine learning model inferencing software 404.

The representation that the one or more subject job posting are missing from the user profile information of the job seeker includes one or more visual elements to output within the job feed at the job seeker device to visually indicate the missing status of the one or more subject job qualifications to the job seeker. For example, the representation may use a user interface element with a format, such as a color and/or a symbol, to visually convey, in connection with the output of a missing job qualification within a GUI of the job feed, that the job qualification is missing from the user profile information of the job seeker. In one non-limiting example, the representation for a job qualification of a job posting may include a generally rectangular shape with the text of the job qualification appearing within it, with the shape being filled in with a yellow color and depicting a question mark symbol at a side thereof.

Different representations may be used for different job qualifications based on whether those job qualifications are known to be present or omitted from the user profile information of the job seeker. For example, where the user profile information includes and thus matches a job qualification of a job posting (e.g., based on an identical match or semantic match determined by the machine learning model), a representation for that job qualification may include a generally rectangular shape with the text of the job qualification appearing within it, with the shape being filled in with a green color and depicting a check mark symbol at a side thereof. In another example, where the user profile information is known to omit and thus not match a job qualification of a job posting (e.g., based on the record of the user profile information including information indicating an earlier confirmation by the job seeker that they do not meet the job qualification), a representation for that job qualification may include a generally rectangular shape with the text of the job qualification appearing within it, with the shape being filled in with a red color and depicting an X symbol at a side thereof. Thus, the representation that the one or more subject job qualifications of the job posting are missing from the user profile information of the job seeker may correspond to one or more such representations.

The one or more prompts asking whether the job seeker meets one or more job qualifications of the job qualifications determined as missing from the user profile information of the job seeker are presented as text alongside the representations for the corresponding job qualifications within the GUI of the job feed. The text is generally phrased for information collection, for example, in the form of a question to inquire as to a relation of the one or more job qualifications to the job seeker. Each such prompt includes one or more user interface elements for input capture responsive to the text of the prompt. For example, where the text of a prompt asks whether the job seeker meets the subject job qualification (e.g., by asking whether the job seeker has experience in a certain field, has a certain skill, has a certain license, or the like), the one or more user interface elements for the prompt may include a first interactive user interface element labeled "Yes" and a second interactive user interface element labeled "No," in which user interaction with either such element indicates the corresponding answer to the prompt text. In such a case, the prompt is configured to obtain input via a single user interaction by the job seeker with the one or more user interface elements of the prompt. For example, the single user interaction may be or otherwise correspond to a single click action performed using a mouse or similar input component of the job seeker device. In another example, the single user interaction may be or otherwise correspond to a single touch action or a single touch gesture performed using a touchscreen interface of the job seeker device. In yet another example, the single user interaction may be or otherwise correspond to another type of gesture or other movement expressed using some or all of a body of the job seeker using a recognition system (e.g., an augmented reality or virtual reality controller or another augmented reality or virtual reality input component).

The representations and prompts determined by the job qualification representation and prompt processing software 408 are output for display at the job seeker device within a GUI of a job feed. In particular, the representations and prompts are output to appear at locations of or near corresponding ones of the job qualifications within a region of the job feed GUI associated with the subject job posting. In some cases, the job qualification representation and prompt processing software 408 may operate against a single job qualification at a time. For example, the job qualification representation and prompt processing software 408 may iteratively receive indications of individual job qualifications of the job posting that are missing from the user profile information of the job seeker and serially present representations and prompts for the individual job qualifications within a GUI of a job feed one at a time. In other cases, the job qualification representation and prompt processing software 408 may batch multiple job qualifications for job seeker actioning at a time. For example, the job qualification representation and prompt processing software 408 may simultaneously present representations and prompts for some or all of the job qualifications of the job posting that are missing from the user profile information of the job seeker within a GUI of a job feed.

The job qualification representation and prompt processing software 408 obtains, from the device of the job seeker, input obtained in response to the one or more prompts and uses that input to output an updated presentation of the job posting within the job feed GUI. For example, based on the input obtained in response to the one or more prompts, the representations of the job qualifications within the job feed GUI can be updated such as to change from a first format (e.g., a first color and/or symbol) to a second format (e.g., a second color and/or symbol). The job qualification representation and prompt processing software 408 also uses that input to update the record of the user profile information of the job seeker within the user profile information data store 416. In this way, when a future job posting is later served to the device of the job seeker within a job feed, if that future job posting includes the same one or more job qualifications which correspond to the input obtained in response to the one or more prompts, the machine learning model inferencing software 404 can use that updated user profile information to determine a match or omission for those one or more job qualifications.

Figure 5B:
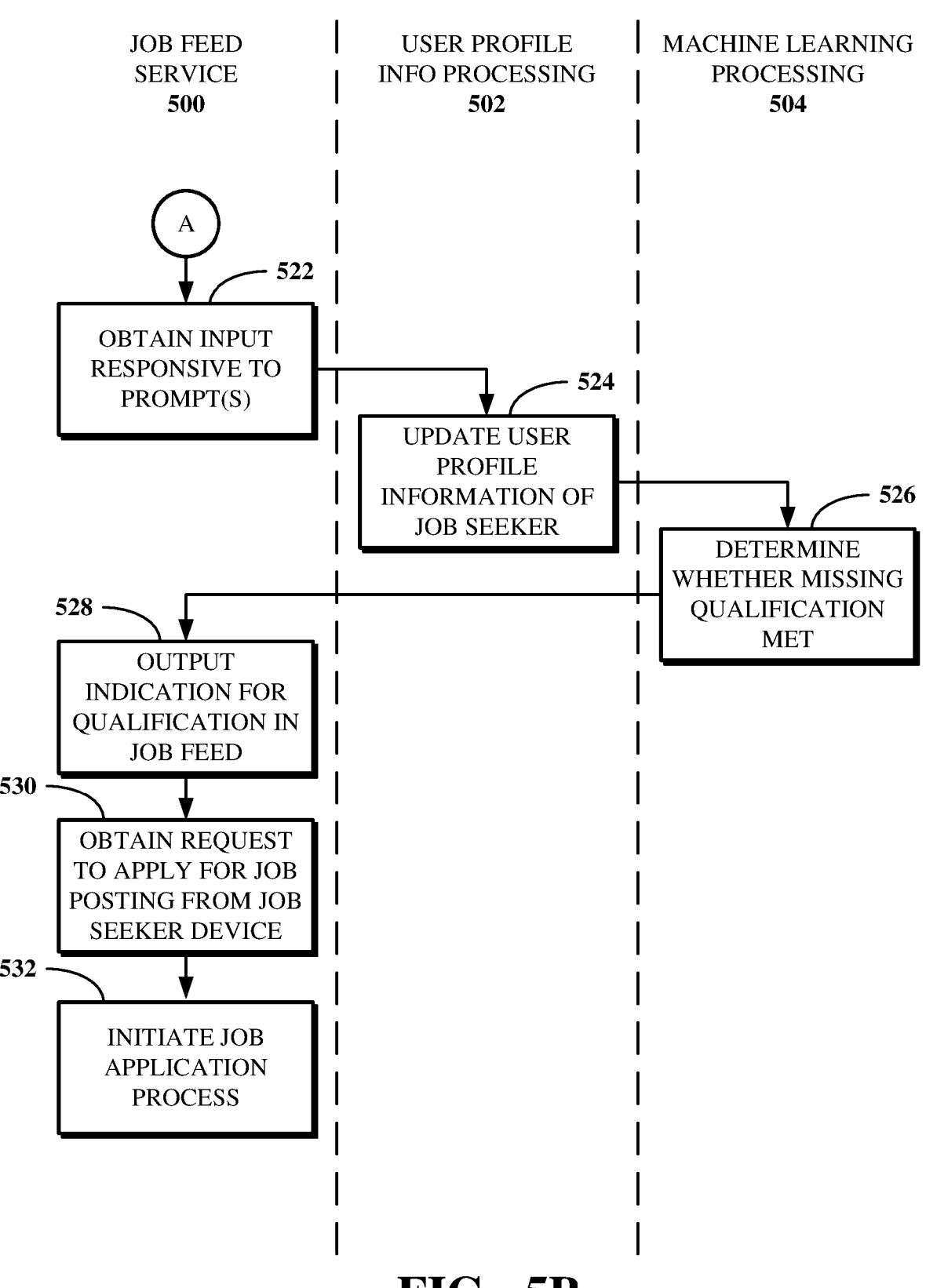

FIGS. 5A-B are swim lane diagrams of an example sequence of operations performed for updating a user profile for job matching. As shown, the sequence of operations is performed between job feed service software 500, user profile information processing software 502, and machine learning processing software 504. For example, the job feed service software 500 may be the job feed service software 306 shown in FIG. 3 and may include the job feed request processing software 406 shown in FIG. 4 and/or the job qualification representation and prompt processing software 408 shown in FIG. 4. In another example, the user profile information processing software 502 may include the user profile information processing software 308 shown in FIG. 3 and/or the job qualification representation and prompt processing software 408 shown in FIG. 4. In yet another example, the machine learning processing software 504 may include the machine learning model training software 402 shown in FIG. 4 and/or the machine learning model inferencing software 404 shown in FIG. 4.

Referring first to FIG. 5A, at 506, the machine learning processing software 504 trains a machine learning model using job data and a web platform taxonomy. At 508, sometime after the machine learning model is trained, the job feed service software 500 receives a request to load a job feed at a job seeker device. At 510, based on the request, the job feed service software 500 obtains available job postings from a corpus of job postings of the web platform. At 512, the user profile information processing software 502 obtains the user profile information of the job seeker. At 514, the user profile information processing software 502 determines relevant job postings from amongst the available job postings based on the user profile information of the job seeker. At 516, the machine learning processing software 504 processes the relevant job postings against the user profile information of the job seeker to determine, for a given such job posting, one or more job qualifications of the job posting that are missing from the user profile information of the job seeker. At 518, the user profile information processing software 502 determines a representation and one or more prompts for the one or more missing job qualifications. At 520, the job feed service software 500 outputs the representation and one or more prompts with the job posting within a GUI of a job feed to serve to the job seeker device.

Referring next to FIG. 5B, at 522, the job feed service software 500 obtains input responsive to the one or more prompts output within the job feed GUI. At 524, the user profile information processing software 502 updates a record of the user profile information of the job seeker according to the obtained input. At 526, the machine learning processing software 504 determines whether the previously missing job qualification is now met by the updated user profile information. At 528, the job feed service software 500 outputs, within the job feed GUI, an indication of whether the previously missing job qualification is met by the updated user profile information and thus whether the job seeker is a match for the job posting. At 530, based on the indication being positive, the job feed service software 500 obtains a request from the job seeker device to apply for the job posting. At 532, based on that request, the job feed service software 500 initiates a job application process for the job posting with the job seeker.

To illustrate example use cases, reference is next made to FIGS. 6, 7, and 8A-D, which are illustrations of example job posting information output within GUIs presented to a job seeker within a job feed. In particular, FIGS. 6, 7, and 8A-D show examples of job posting content, including job qualifications of job postings, output for display within a GUI of a job feed served to a job seeker device. The examples shown in FIGS. 6, 7, and 8A-D are non-limiting as to content, form, and/or format and thus do not require a particular arrangement or expression.

Figure 6:

Referring first to FIG. 6, a GUI 600 shows information associated with a job posting for a Technology Director job, including details of the company associated with the job posting, user interface elements enabling a job seeker to apply for the job or save the job for later consideration, and a profile insights section describing how the user profile information of the job seeker relates to the job posting. In particular, the profile insights section lists a number of skills 602 as job qualifications for the job posting. The skills 602 include or otherwise relate to SQL, debugging, analysis skills, programmable logic controllers, AutoCAD, and Microsoft Windows Server. Based on a processing of the user profile information of the job seeker, the web platform hosting the job posting matches the SQL, debugging, analysis skills, and programmable logic controllers skills to the user profile information to indicate, using a representation formatted with a white color background and a check mark symbol, that those skills are met by the job seeker. Similarly, the web platform indicates, using a representation formatted with a slashed lines in grey color background and an X symbol, that the AutoCAD skill is omitted from the user profile information. However, the Microsoft Windows Server is indicated using a representation formatted with a gray color background and a question mark symbol to indicate that the skill is missing from the user profile information of the job seeker. In view of that, below the skills 602 appears a prompt 604 asking the job seeker if they have experience in Microsoft Windows Server and providing "Yes" and "No" interactive user interface elements usable to collect input via a single click action by the job seeker.

Referring next to FIG. 7, a GUI 700 shows information associated with a job posting for a Nurse Practitioner job, including details of the company associated with the job posting, user interface elements enabling a job seeker to apply for the job or save the job for later consideration, and a profile insights section describing how the user profile information of the job seeker relates to the job posting. In particular, the profile insights section focuses only on job qualifications of the job posting that are determined as missing from the user profile information of the job seeker. In this example, other job qualifications of the job posting, such as those that are determined to be met or not met by the user profile information, are omitted from the GUI 700. Representations and prompts 702 are presented for each of the missing job qualifications, which correspond to multiple job qualification categories including licenses, certifications, and skills. The representations and prompts 702 are batched by their simultaneous presentation within the GUI 700, enabling the job seeker to respond to each of the prompts in any order while others of the prompts remain visible within the GUI 700. Moreover, the representations and prompts 702 are output only for those job qualifications which are considered high priority (e.g., job qualifications that are required for the job as opposed to merely preferred for job applicants, determined according to historically similar job postings). In this example, prompts are provided to ask about whether the job seeker has a valid Certified Nurse Practitioner license, a valid BC/BE certification, and experience in typing; however, a prompt is not provided to ask about whether the job seeker has a Certified Family Nurse Practitioner certificate even though that job qualification is determined as missing from the user profile information of the job seeker. This is because the web platform has recognized that similar Nurse Practitioner job postings have been fulfilled without job seekers holding a Certified Family Nurse Practitioner certificate, and so that job qualification is determined to not be high priority.

Figure 8A:
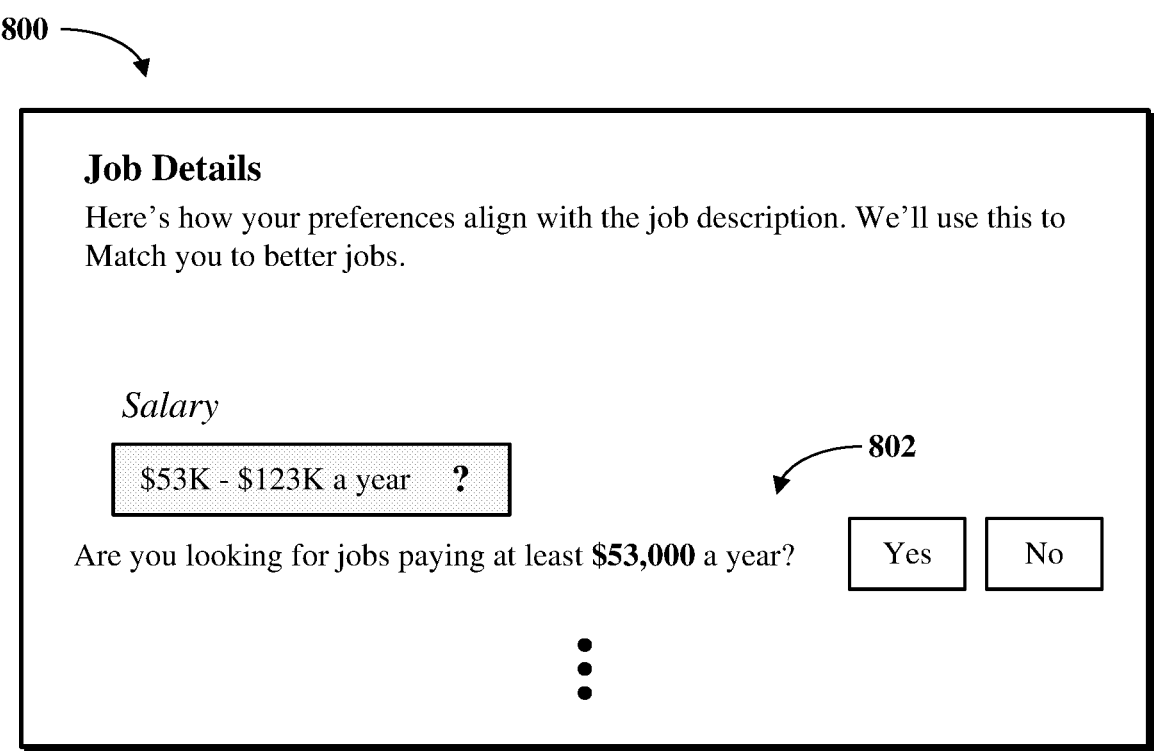

Referring next to FIG. 8A, a GUI 800 includes a job details section describing how job qualifications of the job seeker align with those of the job posting. In this example, the job qualification refers to a preference, specifically, a salary range preference describing the range of salaries that the job seeker is willing to consider. This information enables the web platform to serve relevant job postings to the job seeker within their job feed. The job qualification is determined as missing from the user profile information of the job seeker because the job seeker has either not provided or confirmed information relating to their salary preference. As such, a representation and prompt 802 for this job qualification are presented, in which the representation depicts the job qualification using a format similar to those of the missing job qualifications shown in FIGS. 6 and 7, and the prompt asks the job seeker to confirm a salary preference related to a salary range presented for the subject job posting. Because the salary range is $53,000 to $125,000, the prompt asks whether the job seeker is looking for jobs paying at least $53,000 a year (i.e., the minimum from the listed salary range for the job posting).

Figure 8B:
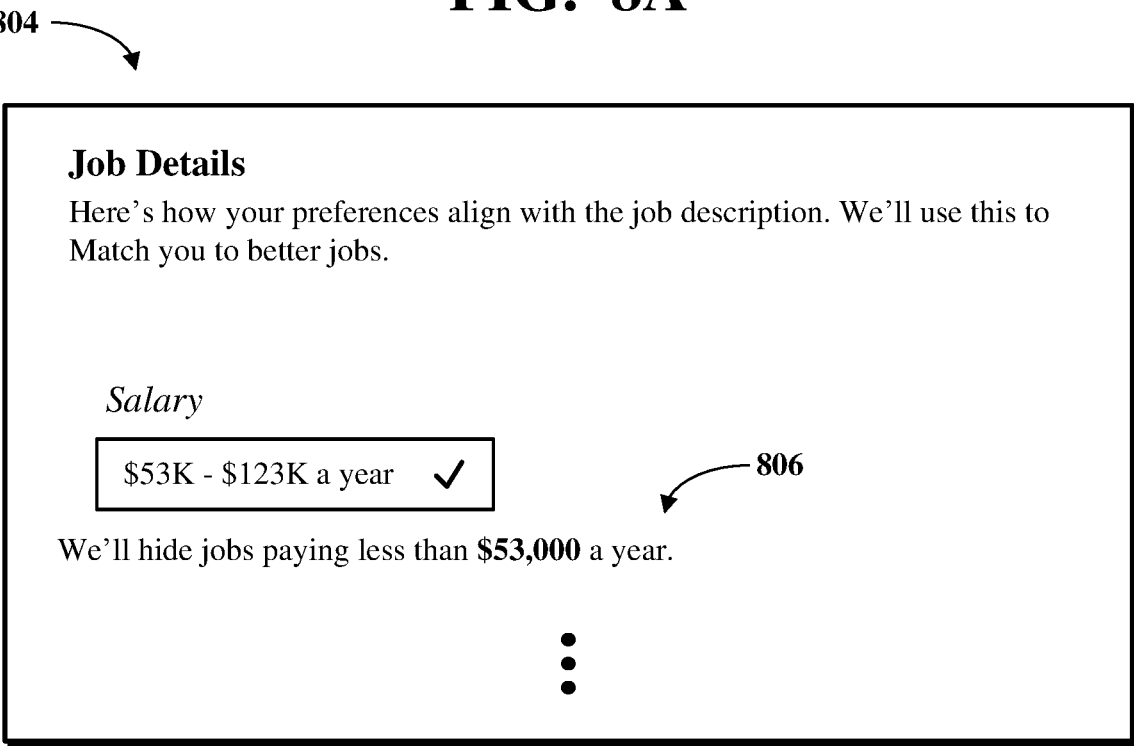

Referring next to FIG. 8B, a GUI 804 shows a change to the GUI 800 shown in FIG. 8A resulting from the job seeker performing a single user interaction against the user interface element labeled "Yes" within the prompt of FIG. 8A. The result of that single user interaction is a confirmation 806 that the job seeker is looking for jobs paying at least $53,000 a year, and thus represents new job qualification information for the job seeker. The user profile information of the job seeker is accordingly updated based on the confirmation 806. In addition to the confirmation 806, the representation of the job qualification is changed from a first format (e.g., a first color and symbol, shown in FIG. 8A as having a gray color and a question mark symbol to indicate that the job qualification is missing from the user profile information of the job seeker) to a second format (e.g., a second color and symbol, shown here as having a white color and a check mark symbol to indicate that the job qualification is met by the user profile information of the job seeker).

Figure 8C:
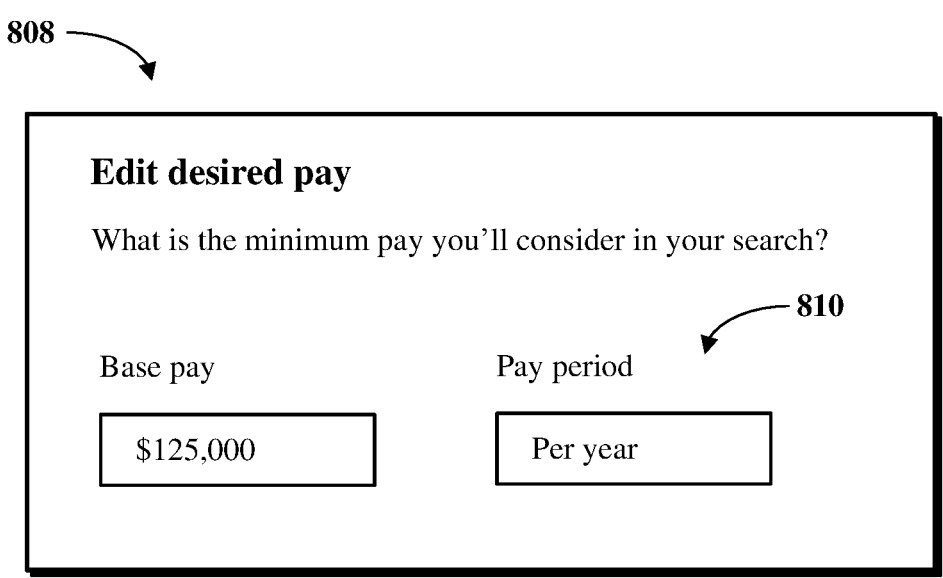

Referring next to FIG. 8C, a GUI 808 shows a pop-up resulting from the job seeker performing a single user interaction against the user interface element labeled "No" within the prompt of FIG. 8A. The pop-up asks the job seeker to enter job qualification information representing their salary preference, based on the confirmation in the GUI 800 that the salary minimum presented therein is not within an acceptable range to the job seeker. In the example shown, the pop-up provides two fields 810 in which a first field asks the job seeker to indicate (e.g., type, where the first field is a text input field, or select, where the first field is a drop-down menu field) a base pay and a second field asks the job seeker to indicate (e.g., type, where the second field is a text input field, or select, where the second field is a drop-down menu field) a pay period for the indicated base pay. The information input within the two fields 810 will be stored as new job qualification information for the job seeker and thus used to update the user profile information of the job seeker.

Figure 8D:
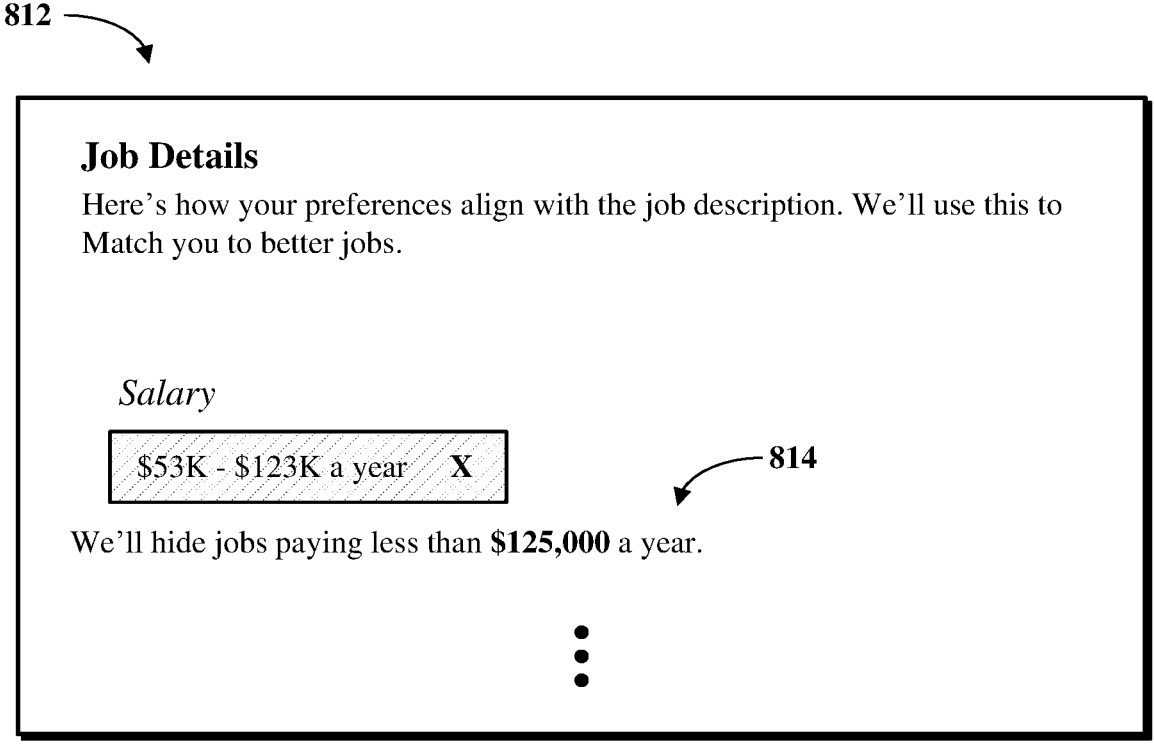

Referring finally to FIG. 8D, a GUI 812 shows a change resulting from the job seeker entering the new job qualification information within the two fields 810 of the GUI 808 shown in FIG. 8C (i.e., that they require a base pay of at least $125,000 per year). The result of that new job qualification information entry is a confirmation 814 that the job seeker is looking for jobs paying at least $125,000 a year. In addition to the confirmation 814, the representation of the job qualification is changed from a first format (e.g., a first color and symbol, shown in FIG. 8A as having a gray color and a question mark symbol to indicate that the job qualification is missing from the user profile information of the job seeker) to a second format (e.g., a second color and symbol, shown here as having a grey color using slashed lines and an X symbol to indicate that the job qualification is not met by the user profile information of the job seeker).

To further describe some implementations in greater detail, reference is next made to examples of techniques which may be performed by or using a system for machine learning-driven profile updates for job matching. FIG. 9 is a flowchart of an example of a technique 900 for machine learning-driven profile updates for job matching. The technique 900 can be executed using computing devices, such as the systems, hardware, and software described with respect to FIGS. 1-8D. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a request is obtained from a job seeker device to access a job feed for a job seeker at a web platform. The web platform is a job website that hosts job postings and stores records of various user profile information of job seekers. The job feed is a collection, grouping, or other set of job postings to serve to the job seeker. The job feed is accessible at a webpage of the web platform. The request to access the job feed may thus, for example, be a request (e.g., a HTTP request) from the job seeker device.

At 904, user profile information of the job seeker is obtained based on the request. In particular, in response to the request to access the job feed, the web platform retrieves user profile information of the job seeker from one or more records stored within one or more data stores. The user profile information includes information indicating job qualifications of the job seeker. For example, the job qualifications of the job seeker may correspond to one or more of a license, certification, specialty, or skill held by the job seeker. These job qualifications of the job seeker may be originally determined by the web platform via input obtained from the job seeker device (e.g., a resume document uploaded to the web platform or resume-based information input within one or more data input fields of an information collection GUI of the web platform) or one or more systems external to the web platform (e.g., an ATS). For example, the user profile information of the job seeker may include first user information obtained directly from the job seeker and second user information inferred based on one or more interactions by the job seeker within the web platform. In some cases, one or more of the job qualifications of the job seeker may be determined by the web platform based on previous interactions by the job seeker within the web platform. The user profile information may also include information indicating job qualification omissions of the job seeker. For example, the job qualification omissions may represent job qualifications that the web platform knows are not met by the job seeker, for example, based on previous interactions by the job seeker within the web platform and/or other information indicative of job qualifications not met by the job seeker.

At 906, a job posting to present within the job feed to the job seeker device is determined based on the user profile information. Determining the job posting can include the web platform accessing one or more data stores that store data associated with job postings hosted by the web platform and awaiting fulfillment to determine, based on job titles and/or other information associated with the job postings, that the job posting is relevant to the job seeker based on the user profile information. For example, the web platform can determine that the job posting is relevant to the job seeker based on the user profile information indicating that the job seeker has work experience in the field that is the subject of the job posting or in a position having the same or a semantically similar job title to the job title of the job posting. In another example, the web platform can determine that the job posting is relevant to the job seeker based on user profile information indicating that the job seeker has a license or specialty related to the job posting.

At 908, a determination is made that a job qualification of the job posting is missing from the user profile information of the job seeker. The web platform uses a machine learning model to determine that the job qualification of the job posting is missing from the user profile information of the job seeker. The machine learning model is trained to contextually evaluate various user profile information of job seeker users of the web platform against job qualifications of the job postings hosted by the web platform. For example, the machine learning model may be trained to identify qualification information and job qualifications related to other qualification information and job qualifications using a taxonomy of the web platform and based on one or more of data of a corpus of job postings of the web platform, data of the records of the various user profile information, or data of one or more systems external to the web platform.

In particular, determining that the job qualification is missing from the user profile information can include extracting qualification information for the job seeker from a record of the user profile information of the job seeker and inferencing, using the machine learning model, the qualification information and other qualification information ontologically related to the qualification information against job qualifications of the job posting and other job qualifications ontologically related to the job qualifications to determine that the qualification information and the other qualification information are missing the job qualification. For example, this can include determining an ontological distance between a job qualification of the job posting and the qualification information of the job seeker within a taxonomy of the web platform. In some cases, the qualification information for the job seeker can correspond to one or more aspects of the user profile information, such as the first user information and the second user information described above. The job qualification determined as missing from the user profile information may, for example, be a high priority job qualification required by the job posting and designated as high priority by the web platform.

In some implementations, determining that a job qualification of the job posting is missing from the user profile information of the job seeker can include determining that user profile information corresponds to the job qualification but is not detailed enough to clearly indicate whether the job qualification is actually met by the job seeker. For example, where the job qualification of the job posting is a skill for "Call center experience" and the user profile information includes a job qualification for "Customer service experience," the job qualification may be determined as missing from the user profile information of the job seeker because those skills, while similar, are not closely enough related to clearly understand whether the job seeker meets the job qualification of the job posting.

Determining that the job qualification of the job posting corresponds to the job qualification but is not detailed enough to clearly indicate whether the job qualification is actually met by the job seeker can include the machine learning model or another aspect of the web platform determining whether an ontological distance between the job qualification of the job posting and the corresponding job qualification of the user profile information is less than a threshold. For example, the threshold may represent a maximum degree of semantic separation between the job qualification of the job posting and the job qualification of the user profile information. Determining the ontological distance can include determining a number of hops (e.g., nodes or other elements) between a node or element corresponding to the job qualification of the job posting within a taxonomy of the web platform and a node or element corresponding to the job qualification of the user profile information within that taxonomy.

At 910, a representation that the job qualification is missing from the user profile information and a prompt for input asking whether the job seeker meets the missing job qualification are output for display at the job seeker device within the job feed. For example, outputting the representation and the prompt can include outputting information of the job posting within a GUI of the web platform and used for the job feed in which the job qualification appears at a first location within the information of the job posting, and outputting the representation and the one or more prompts to appear at locations corresponding to the first location within the graphical user interface. For example, the job feed may include multiple sections each corresponding to a different job posting. The section to which the subject job posting corresponds may include information about the job posting, such as the job title and the company associated with the job posting in a first area and a second area which includes the job qualification. The representation and the prompt may be output within that second area alongside the job qualification for ease of reference by the job seeker.

In some cases, representations may be output for job qualifications that are met by the user profile information in addition to the representation output for the job qualification determined as missing from the user profile information. For example, outputting the representation can include outputting the representation within the job feed GUI using a first user interface element in a first format and outputting representations for other job qualifications of the job posting which are present in the user profile information of the job seeker within the job feed GUI using a second user interface element in a second format different from the first format. The first format may, for example, use at least one of a first color or a first symbol to express an unknown relation of the missing one or more job qualifications to the job seeker and the second format may, for example, use at least one of a second color or a second symbol to express a known relation of the other job qualifications to the job seeker. In other cases, the representations output within the job feed GUI may be limited to the representation for the job qualification determined as missing from the user profile information of the job seeker.

The prompt includes text inquiring as to a relation of the job qualification determined as missing from the user profile information to the job seeker and one or more user interface elements configured for the job seeker to interact with within the GUI to provide input in response to the prompt. For example, the prompt may include a question asking the job seeker as to whether they have experience with a certain skill or hold a certain license. The one or more user interface elements are configured to receive input from the job seeker device and may, for example, include one or more interactive (e.g., clickable) elements, such as boxes with text (e.g., "Yes" or "No") labeled thereon, one or more text input fields, one or more drop down menus, a combination thereof, or the like.

At 912, input indicating whether the job seeker meets the missing job qualification is obtained from the job seeker device in response to the prompt. The input may, based on the user interface element from which it is obtained, correspond to that user interface element or to content collected using that user interface element. For example, where the user interface element is a "Yes" or "No" box which can be interacted with by the job seeker, obtaining the input can include obtaining the input via a single click action by the job seeker interacting with the user interface element. In another example, where the user interface element is a text input field or a drop down menu, obtaining the input can include obtaining the input entered or selected within the user interface element.

At 914, the user profile information of the job seeker is updated according to the input obtained in response to the prompt. Updating the user profile information of the job seeker according to the input can include adding the job qualification previously determined as missing to the user profile information to indicate that the job seeker meets the job qualification where the input indicates that the user meets the job qualification. Otherwise, updating the user profile information of the job seeker according to the input can include indicating an omission of the job qualification for the job seeker within the user profile information to indicate that the job seeker does not meet the job qualification where the input indicates that the user does not meet the job qualification. In either case, a record of the user profile information is accordingly updated.

At 916, the job posting information is updated within the job feed GUI based on the input obtained from the job seeker device in response to the prompt. Updating the job posting information within the job feed GUI based on the input obtained from the job seeker device includes using the updated user profile information to indicate, based on the input, whether the job qualification is met by the job seeker. The job feed GUI may, for example, be automatically updated (e.g., refreshed) in response to the updated user profile information (e.g., based on a retrieval of the updated user profile information from the record stored within the data store of the web platform). For example, where the job qualification is met by the job seeker, the job feed GUI may be updated to include a recommendation for the job seeker to apply to the job posting or otherwise to include an indication that the job seeker may now qualify for the job posting. In another example, where the job qualification is not met by the job seeker, the job feed GUI may be updated to include an indication that the job seeker may not qualify for the job posting or otherwise to remove the job posting from the job feed.

The technique 900 is described above as being used to determine and process updates with respect to one job qualification of a job posting; however, in some implementations, the technique 900 may instead be used to determine and process other numbers of job postings missing from user profile information of a job seeker. For example, multiple job qualifications of a job posting may simultaneously or nearly simultaneously be determined as missing from the user profile information of the job seeker using the machine learning model in the same manner as described above. Different representations and prompts may then be output for some or all of those multiple job qualifications within the job feed GUI. In particular, the web platform may batch process the multiple job qualifications to simultaneously present prompt corresponding to each within the job feed GUI. For example, representations and prompts may be output for each of the multiple job qualifications. In another example, representations and prompts may be output only for ones of the multiple job qualifications that are determined as high priority job qualifications (e.g., licenses or specialties determined as high priority based on historically similar job postings).

The technique 900 is described as using a single machine learning model; however, in some implementations, the technique 900 may use multiple machine learning models. For example, the multiple machine learning models may be trained for the same purpose or for different purposes.

In some implementations, the job qualification of the job posting determined as missing from the user profile information of the job seeker may correspond to a preference of the job seeker that is unspecified when the job posting is served to the job seeker device. For example, the job qualification may correspond to a salary range for the job posting in which the job posting lists a certain salary or range and the user profile information of the job seeker does not indicate whether that salary or range is acceptable to the job seeker. The processing of the job qualification in such a case remains as described above, including the updating of the user profile information based on input obtained in response to a prompt and the outputting of the updated job posting information within the job feed GUI based on that input.

In some implementations, the technique 900 may be performed in connection with a search query presented for processing to a search engine, as the web platform, instead of to a job posting and user profile information at a job website. For example, the technique 900 in such a case may include obtaining, by the web platform, a search request from a user device. The search request includes a search query expressed in a plain language or search logic format. The technique 900 may then include performing a search based on the search request to determine a preliminary result that is relevant to the search request. The preliminary result may be a search result that is relevant to the search request, but which includes an attribute determined as missing from the search request. For example, the missing attribute may correspond to a keyword, name, or logic element. The web platform can determine the preliminary result based on one or more of user search history information corresponding to the user of the user device from which the search request is obtained, trending search requests from multiple users of the web platform, historically relevant search requests (e.g., based on semantic relationships to one or more attributes included in the search request), or the like. For example, a semantic relationship between an attribute included in the search request and the missing attribute may be determined using a search engine taxonomy defining relationships (e.g., in units of hops or other distance between nodes or elements thereof, in which each node or element corresponds to a different attribute) between attributes. In some cases, the web platform may use a machine learning model trained to recognize relationships between attributes to determine the missing attribute. The preliminary result can thus be considered a search result which may be presented to the user device in response to the search request where the search request is updated to include the missing attribute.

The web platform outputs, based on the preliminary result determination, the preliminary result within a search result GUI for display at the user device along with a representation and a prompt in connection with the output of the preliminary result. For example, the representation may use a format (e.g., a color and/or symbol) to indicate that the attribute may be missing from the search request, and the prompt includes a question asking the search user whether the search request should be updated to include the attribute. For example, the representation may be similar or the same in appearance as the representation described above for the job qualification determined as missing from the user profile information of the job seeker. In some cases, the prompt may indicate other types of search results, or specific such search results, which may be returned where the search request is updated to include the missing attribute. The prompt may further include one or more user interface elements which may be interacted with by the user of the user device (e.g. via a single click action) to provide input in response to the prompt. For example, where the prompt asks whether the search result should be updated to include the missing attribute, a user interface element of the prompt may include an interactive user interface button that, when interacted with (e.g., clicked on) at the user device, causes the web platform to update the search request to include the missing attribute and to automatically repeat the search according to the updated search request. Based on input obtained in response to that prompt, the web platform updates the search results and outputs the updated search results within a search GUI for display at the user device.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, Python, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "component" and "aspect" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of this disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time.

A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

training, using job posting data of a corpus of a web platform and a knowledge graph classifying semantically normalized information associated with the corpus of the web platform, a supervised neural network to contextually evaluate job qualifications of job seekers against job qualifications of job postings hosted by the web platform and to output indications of ones of the job qualifications of the job postings that are missing from the job qualifications of the job seekers;

receiving, by a web server of the web platform from a device of a job seeker, a hypertext transport protocol request for a job feed that is of the web platform and based on information associated with the job seeker;

inferencing, by the web platform automatically in response to the hypertext transport protocol request, against the corpus of the web platform using the supervised neural network to identify, for each of multiple job postings to include within the job feed, one or more job qualifications required for the job posting that are missing from job qualifications of the job seeker;

outputting, by the web server in response to the hypertext transport protocol request and based on output of the inferencing using the supervised neural network, a graphical user interface associated with the web platform for display at the device of the job seeker, wherein the graphical user interface simultaneously presents visual elements associated with each of the multiple job postings, wherein the visual elements associated with a given job posting of the multiple job postings includes at least a first visual element using a first color and symbol to indicate a first job qualification of the given job posting that is met by the job seeker and a second visual element using a second color and symbol to indicate a missing status of a second job qualification of the given job posting, and wherein the graphical user interface further presents interactive prompts for each of the visual elements that uses the second color and symbol;

receiving, by the web platform from the device of the job seeker, input based on interactions with the interactive prompts within the graphical user interface, wherein the input indicates whether corresponding job qualifications having the missing status are met by the job qualifications of the job seeker;

updating, automatically by the web platform, the graphical user interface to batch process the multiple job postings in response to the input, wherein the batch processing of the multiple job postings causes changes, within the job feed, to at least one visual element of at least one of the multiple job postings; and outputting, by the web server for display at the device of the job seeker, the updated graphical user interface to present, to the job seeker, the changes to the at least one visual element of the at least one of the multiple job postings.

2. The method of claim 1, wherein inferencing against the corpus of the web platform using the supervised neural network to identify the one or more job qualifications required for the job posting that are missing from the job qualifications of the job seeker comprises:

extracting qualification information for the job seeker from a record of user profile information of the job seeker; and inferencing, using the supervised neural network, the qualification information and other qualification information ontologically related to the qualification information against job qualifications of the job posting and other job qualifications ontologically related to the job qualifications to determine that the qualification information and the other qualification information are missing the one or more job qualifications.

3. The method of claim 2, wherein the user profile information includes first user information obtained directly from the job seeker and second user information inferred based on one or more interactions by the job seeker within the web platform, and wherein the qualification information corresponds to the first user information and the second user information.

4. The method of claim 3, comprising:

updating the record of the user profile information of the job seeker to include third user information confirmed by the job seeker based on the input.

5. The method of claim 2, wherein the supervised neural network is trained to identify the other qualification information and the other job qualifications using a taxonomy of the web platform and based on one or more of data of the corpus of the web platform, data of the records of the user profile information, or data of one or more systems external to the web platform.

6. The method of claim 1, wherein outputting the graphical user interface associated with the web platform for display at the device of the job seeker comprises:

outputting the first visual element at a first location within the graphical user interface and the second visual element at a second location within the graphical user interface.

7. The method of claim 6, wherein the first visual element is in a first format and the second visual element is in a second format different from the first format.

8. The method of claim 7, wherein the first format indicates an unknown relation of the one or more job qualifications to the job seeker and the second format indicates a known relation of others of the one or more job qualifications to the job seeker.

9. The method of claim 6, wherein the interactive prompts include text inquiring as to a relation of one or more high priority job qualifications to the job seeker and user interface elements configured for the job seeker to interact with within the graphical user interface to provide the input.

10. The method of claim 9, comprising:

obtaining the input via a single user interaction by the job seeker interacting with the user interface elements; and updating a record of user profile information of the job seeker based on the input.

11. The method of claim 9, wherein the one or more job qualifications includes a first job qualification and a second job qualification and the method comprises:

batch processing the first job qualification and the second job qualification to simultaneously present a first prompt of the interactive prompts and a second prompt of the interactive prompts corresponding to the second job qualification within the graphical user interface.

12. The method of claim 1, wherein each of the one or more job qualifications corresponds to one of a license, a certification, a specialty, or a skill.

13. A non-transitory computer readable medium storing instructions operable to cause one or more processors to perform operations comprising:

receiving, by a web server of a web platform that hosts job postings and stores records associated with job seekers and from a device of a job seeker, a hypertext transport protocol request for a job feed that is of the web platform and based on information associated with the job seeker;

inferencing, by the web platform in response to the hypertext transport protocol request, against a corpus of the web platform using a supervised neural network to identify, for each of multiple job postings to include within the job feed, one or more job qualifications required for the job posting that are missing from job qualifications of the job seeker, wherein the supervised neural network is trained to contextually evaluate user profile information against job qualifications of the job postings hosted by the web platform using job posting data of the corpus of a web platform and a knowledge graph classifying semantically normalized information associated with the corpus of the web platform;

outputting, by the web server in response to the hypertext transport protocol request and based on output of the inferencing using the supervised neural network, a graphical user interface for display at the device of the job seeker, wherein the graphical user interface simultaneously presents visual elements associated with each of the multiple job postings, wherein the visual elements associated with a given job posting of the multiple job postings includes at least a first visual element using a first color and symbol to indicate a first job qualification of the given job posting that is met by the job seeker and a second visual element using a second color and symbol to indicate a missing status of a second job qualification of the given job posting, and wherein the graphical user interface further presents interactive prompts for each of the visual elements that uses the second color and symbol;

updating, automatically by the web platform, the graphical user interface to batch process the multiple job postings in response to input obtained from the device of the job seeker based on interactions with the interactive prompts within the graphical user interface, wherein the batch processing of the multiple job postings causes changes, within the job feed, to at least one visual element of at least one of the multiple job postings; and outputting, by the web server for display at the device of the job seeker, the updated graphical user interface to present, to the job seeker, the changes to the at least one visual element of the at least one of the multiple job postings.

14. The non-transitory computer readable medium of claim 13, the operations comprising:

updating the user profile information according to the input to indicate that the job seeker meets at least one high priority job qualification of the one or more job qualifications.

15. The non-transitory computer readable medium of claim 13, wherein the operations for inferencing against the corpus of the web platform using the supervised neural network to identify the one or more job qualifications required for the job posting that are missing from the job qualifications of the job seeker comprise:

determining an ontological distance between a job qualification of the one or more job qualifications and the job qualifications of the job seeker within a taxonomy of the web platform.

16. The non-transitory computer readable medium of claim 13, wherein the job qualifications of the job seeker are obtained from one or more of a resume document obtained from the job seeker by the web platform, a data input field used to collect job seeker information by the web platform, or a system external to the web platform, and wherein the one or more job qualifications each correspond to one of a license, a certification, a specialty, or a skill associated with the job posting.

17. A system, comprising:

a memory subsystem configured to store instructions; and processing circuitry configured to execute the instructions to:

inference, by a web platform that hosts job postings and stores records associated with job seekers in response to a hypertext transport protocol request for a job feed that is of the web platform and based on information associated with a job seeker, against a corpus of the web platform using a supervised neural network to identify, for each of multiple job postings to include within the job feed, one or more job qualifications required for the job posting that are missing from job qualifications of the job seeker, wherein the supervised neural network is trained to contextually evaluate user profile information for job seekers of the web platform using job posting data of the corpus of a web platform and a knowledge graph classifying semantically normalized information associated with the corpus of the web platform;

prompt, via a graphical user interface displaying information of the job feed and output by a web server of the web platform in response to the hypertext transport protocol request and based on output of the inference using the supervised neural network, a device of the job seeker to indicate whether the job seeker meets the one or more job qualifications, wherein the graphical user interface simultaneously presents visual elements associated with each of the multiple job postings, wherein the visual elements associated with a given job posting of the multiple job postings includes at least a first visual element using a first color and symbol to indicate a first job qualification of the given job posting that is met by the job seeker and a second visual element using a second color and symbol to indicate a missing status of a second job qualification of the given job posting, and wherein the graphical user interface further presents interactive prompts for each of the visual elements that uses the second color and symbol; and update, automatically by the web platform, the graphical user interface to batch process the multiple job postings in response to input obtained from the device of the job seeker based on interactions with the interactive prompts within the graphical user interface, wherein the batch processing of the multiple job postings causes changes, within the job feed, to at least one visual element of at least one of the multiple job postings.

18. The system of claim 17, wherein the interactive prompts use a user interface element configured to receive the input via a single user interaction performed using the device of the job seeker.

19. The system of claim 17, wherein the one or more job qualifications include a job qualification required by the job posting and designated as high priority by the web platform.

20. The system of claim 17, wherein, to inference against the corpus of the web platform using the supervised neural network to identify the one or more job qualifications required for the job posting that are missing from the job qualifications of the job seeker, the processing circuitry is configured to execute the instructions to:

inference, using the supervised neural network, qualification information of the job seeker and other qualification information ontologically related to the qualification information against job qualifications of the job posting and other job qualifications ontologically related to the job qualifications to determine that the qualification information and the other qualification information are missing high priority job qualification.

* * * * *